(12) United States Patent
Soerensen

(10) Patent No.: US 12,305,815 B2
(45) Date of Patent: May 20, 2025

(54) WIND PARK WITH PRESSURE-CONTROLLED PIPELINE SYSTEM

(71) Applicant: Siemens Gamesa Renewable Energy A/S, Brande (DK)

(72) Inventor: Johnny Soerensen, Videbæk (DK)

(73) Assignee: SIEMENS GAMESA RENEWABLE ENERGY A/S, Brande (DK)

(*) Notice: Subject to any disclaimer, the term of this patent is extended or adjusted under 35 U.S.C. 154(b) by 0 days.

(21) Appl. No.: 18/280,140

(22) PCT Filed: Feb. 23, 2022

(86) PCT No.: PCT/EP2022/054524
§ 371 (c)(1),
(2) Date: Sep. 1, 2023

(87) PCT Pub. No.: WO2022/189148
PCT Pub. Date: Sep. 15, 2022

(65) Prior Publication Data
US 2024/0068625 A1    Feb. 29, 2024

(30) Foreign Application Priority Data

Mar. 8, 2021  (EP) ..................... 21161258

(51) Int. Cl.
*F17D 1/14*    (2006.01)
*F03D 9/10*    (2016.01)
(Continued)

(52) U.S. Cl.
CPC ................ *F17D 1/14* (2013.01); *F03D 9/10* (2016.05); *F17D 1/02* (2013.01); *F03D 9/19* (2016.05);
(Continued)

(58) Field of Classification Search
CPC ..... F17D 1/14; F17D 1/02; F03D 9/10; F03D 9/19; F03D 9/257; F03D 13/25; F05B 2220/61; F16L 1/26; Y02E 10/72
(Continued)

(56) References Cited

U.S. PATENT DOCUMENTS 8,381,766 B2 *   2/2013   Fennimore .............. C01B 3/065
                                                        137/565.11
10,840,572 B1 * 11/2020  Luz ........................... F03D 9/10
(Continued)

FOREIGN PATENT DOCUMENTS

EP    2777110 A2    9/2014
EP    2777111 A2    9/2014
(Continued)

OTHER PUBLICATIONS

PCT International Search Report and Written Opinion of International Searching Authority mailed May 30, 2022 corresponding to PCT International Application No. PCT/EP2022/054524 filed Feb. 23, 2022.

*Primary Examiner* — Minh Q Le
(74) *Attorney, Agent, or Firm* — Schmeiser, Olsen & Watts, LLP

(57) ABSTRACT

A system for transporting fluid generated by a wind turbine includes at least one wind turbine for generating electrical power, wherein the wind turbine includes a fluid producing unit configured for generating a fluid by using the generated electrical power, a fluid pipeline system coupled to the wind turbine for transporting the generated fluid, and a pressure control system coupled to the fluid pipeline system for controlling the fluid flow of the fluid in the pipeline system. The pipeline system includes a transporting pipeline and a connection pipeline, wherein the connection pipeline is coupled to the wind turbine and the connection pipeline such (Continued)

that the fluid is transportable from the wind turbine to the transporting pipeline via the connection pipeline.

13 Claims, 16 Drawing Sheets

(51) Int. Cl.
*F17D 1/02* (2006.01)
*F03D 9/19* (2016.01)
*F03D 9/25* (2016.01)
*F03D 13/25* (2016.01)
*F16L 1/26* (2006.01)

(52) U.S. Cl.
CPC .............. *F03D 9/257* (2017.02); *F03D 13/25* (2016.05); *F05B 2220/61* (2013.01); *F16L 1/26* (2013.01); *Y02E 10/72* (2013.01)

(58) Field of Classification Search
USPC .................................................. 137/565.01
See application file for complete search history.

(56) References Cited

U.S. PATENT DOCUMENTS

| | | | | |
|---|---|---|---|---|
| 2004/0156728 A1* | 8/2004 | Gebel | .................... | F03D 15/10 |
| | | | | 417/334 |
| 2005/0129996 A1 | 6/2005 | Moulthrop et al. | | |
| 2008/0121525 A1* | 5/2008 | Doland | .................... | C25B 1/04 |
| | | | | 322/29 |
| 2014/0175799 A1 | 6/2014 | Tabe | | |
| 2016/0281685 A1* | 9/2016 | Grabau | .................... | F03D 1/00 |
| 2017/0077687 A1* | 3/2017 | Soerensen | ................ | H02G 9/06 |
| 2018/0030958 A1* | 2/2018 | Sant | ......................... | F03D 9/28 |
| 2018/0209306 A1* | 7/2018 | Heid | ....................... | F01K 13/02 |
| 2021/0404439 A1* | 12/2021 | Kinsella | ................ | C25B 15/085 |
| 2022/0003336 A1 | 1/2022 | Soerensen | | |
| 2023/0020149 A1* | 1/2023 | Madsen | .................. | C25B 15/00 |
| 2023/0026470 A1* | 1/2023 | Soerensen | ................. | F03D 7/04 |
| 2023/0167804 A1* | 6/2023 | Dincan | .................... | F03D 9/19 |
| | | | | 290/43 |
| 2023/0184391 A1* | 6/2023 | Hoegh | .................... | F17D 3/145 |
| | | | | 137/551 |
| 2024/0002257 A1* | 1/2024 | Lee | ......................... | C02F 1/447 |
| 2024/0183336 A1* | 6/2024 | Hawkins | ................ | C25B 15/023 |

FOREIGN PATENT DOCUMENTS

| | | |
|---|---|---|
| EP | 3086424 A1 | 10/2016 |
| EP | 3760860 A1 | 1/2021 |
| WO | 2020095012 A1 | 5/2020 |
| WO | 2021004787 A1 | 1/2021 |

* cited by examiner

WIND PARK WITH PRESSURE-CONTROLLED PIPELINE SYSTEM

CROSS-REFERENCE TO RELATED APPLICATIONS

This application claims priority to PCT Application No. PCT/EP2022/054524, having a filing date of Feb. 23, 2022, which claims priority to EP Application No. 21161258.5, having a filing date of Mar. 8, 2021, the entire contents both of which are hereby incorporated by reference.

FIELD OF TECHNOLOGY

The following relates to a system and method for transporting fluid, in particular electrolyzed fluid, generated by a wind turbine comprising a fluid producing unit, in particular an electrolyzer unit, and a respective pressure-controlled pipeline system. Furthermore, the following relates to a method for transporting fluid generated by a wind turbine.

BACKGROUND

In order to generate regenerative energy, wind parks comprising a plurality of wind turbines are provided. Specifically, in order to have enough installation space for the wind turbines, large wind parks are provided offshore. Principally, only electrical cables are connected from offshore windfarms to an onshore station. It is however quite expensive to install such power transmission lines including the cable cost itself especially over long distances as is normally the case with modern wind farms (e.g., +5 km from shore). An alternative way of transporting an energy source from an offshore wind turbine is to utilize the power produced by the wind turbine in a gas producing facility placed at or near the wind turbine, e.g., an electrolysis equipment generating hydrogen gas (and oxygen), which in turn can be used to produce other gaseous products such as ammonia or methane. Once produced, the gases, in particular the hydrogen, can be transported onshore and consumed by other processes or used in a hydrogen fuel cell to produce electricity. Overall, the transport of hydrogen, in particular in a pipeline system, may be less expensive than transporting electricity directly to shore.

Hence, there may be a need to provide a safe transportation system for hydrogen produced by wind turbines to a desired destination.

SUMMARY

An aspect relates to provide a system for transporting gas, in particular hydrogen, generated by a wind turbine with an efficient and safe transportation to a desired destination.

This aspect may be solved by a system and a method for transporting gas generated by a wind turbine and by a method for providing a system for transporting gas generated by a wind turbine.

According to a first aspect, a system for transporting fluid, e.g., gas or liquid, in particular electrolyzed gas, generated by a wind turbine is presented. The system comprises at least one wind turbine for generating electrical power, wherein the wind turbine comprises a fluid (e.g., gas) producing unit, e.g. an electrolyzer unit, configured for generating fluid, e.g., gas or liquid, in particular electrolyzed gas, by using the generated electrical power.

The system further comprises a fluid, e.g., gas, pipeline system coupled to the wind turbine for transporting the generated fluid, e.g. gas or liquid, in particular electrolyzed gas, and a pressure control system coupled to the fluid pipeline system for controlling the fluid flow of the gas, in particular electrolyzed gas, in the pipeline system. The pipeline system comprises a transporting pipeline and a connection pipeline, wherein the connection pipeline is coupled to the wind turbine and the connection pipeline such that the gas, in particular electrolyzed gas, is transportable from the wind turbine to the transporting pipeline via the connection pipeline.

According to a further a further aspect, a method for transporting fluid, e.g., gas or liquid, in particular electrolyzed gas, generated by a wind turbine is presented. The method comprises providing at least one wind turbine for generating electrical power, wherein the wind turbine comprises a fluid, e.g., gas or liquid, generating unit, e.g. an electrolyzer unit, configured for generating fluid, e.g. gas or liquid, in particular electrolyzed gas, by using the generated electrical power. Furthermore, according to the method, a fluid, e.g., gas or liquid, pipeline system is coupled to the wind turbine for transporting the generated gas, in particular electrolyzed fluid, and a pressure control system is coupled to the fluid pipeline system for controlling the fluid flow of the fluid, e.g. gas or liquid, in particular electrolyzed gas, in the pipeline system. The pipeline system comprises a transporting pipeline and a connection pipeline, wherein the connection pipeline is coupled to the wind turbine and the connection pipeline such that the fluid, e.g., gas or liquid, in particular electrolyzed gas, is transportable from the wind turbine to the transporting pipeline via the connection pipeline.

The wind turbine of the system comprises a wind turbine tower and a respective nacelle, to which rotatable wind turbine blades are coupled. Upon rotation of the blades by wind force, a generator in the nacelle generates electrical power. The electrical power can be guided by power lines to a desired destination.

The wind turbine according to embodiments of the present invention further comprises a fluid, e.g. gas or liquid, producing unit, e.g. an electrolyzer unit. The fluid producing unit is fed by an educt, such as water, and produced by the use of the electrical power generated by the wind turbine respective electrolyzed fluid, e.g. gas or liquid, such as hydrogen and oxygen. The educt may be provided by supplying pipelines or, e.g., in case of water as educt, from the sea/lake/river or the groundwater. Specifically, the electrolyzer unit generates a first electrolyzed fluid, such as hydrogen, which is transported by the pipeline. Additionally, the electrolyzer unit may generate a second electrolyzed fluid, such as oxygen. The second electrolyzed fluid, e.g., gas or liquid, may be bled off or may be transported in a further pipeline system.

The pipelines of the pipeline system can comprise of various materials. One example may be plastic material, such as high-density polyethylene (HDPE) as connecting pipeline between the turbines and a steel pipe as transporting pipeline and/or main pipeline. However, the transporting pipeline and/or main pipeline may also be of plastic material. The pipelines may be flexible and for example rollable to be stored on an assembly vessel. The pipelines can be developed with additional seal layers in the structure in order to provide a sufficient sealing e.g., for hydrogen as electrolyzer gas. The seal layer can be composite, Kevlar other new materials flexible and with sealing properties.

Furthermore, according to an approach of embodiments of the present invention, the pressure control system is provided which controls the flow of the fluid, e.g. gas or liquid, in particular electrolyzed gas, to the connection pipeline and to the transportation pipeline. For example, if the mass flow and hence the pressure of the fluid, e.g. gas or liquid, in particular electrolyzed gas, varies, the pressure control system may control for example the pressure in the connection pipeline or the transporting pipeline such that a desired flow of fluid, e.g. gas or liquid, in particular electrolyzed gas, is provided. In particular, a backflow of fluid, e.g., gas or liquid, in particular electrolyzed gas, back to the fluid generating unit, e.g. an electrolyzer unit, may be for example prevented. Additionally, if leakage of the pipeline system or of the gas generating unit, e.g., an electrolyzer unit, is detected, the pressure control system controls the flow of the fluid, e.g. gas or liquid, in particular electrolyzed gas, for example by bypassing the leakage section. Detailed embodiments of the pressure control system are described in detail below. Hence, the control system includes a pressure monitoring and system control to detect leaks and operate the system to make for example a bypass of the leakage location automatically.

According to the further exemplary embodiment, the pressure control system comprises a fluid, e.g., gas or liquid, control valve installed in the connection pipeline for controlling the flow of the electrolyzed fluid, wherein the fluid, e.g. gas or liquid, control valve is in particular a non-return valve. By installing a fluid, e.g., gas or liquid, control valve in the connection pipeline, i.e. between the fluid generating unit and the transportation pipeline, for example the mass flow and the pressure of the first fluid flowing into the transporting pipeline can be reduced or increased. Hence, a backflow of the fluid to the wind turbine can be prevented.

The fluid control valve (e.g., a non-return valve) is placed between the wind turbine and transporting pipeline which ensures one way only in the pipeline system. The flow direction of the gas in the main array pipe is one-way only. Hence, a wind turbine can be isolated if there is a back flow (leaking pipe). The flow in the transporting pipeline can be directed in both directions.

According to further exemplary embodiment, the pressure control system comprises a multi-way valve, wherein the multi-way valve is coupled to the transporting pipeline and the wind turbine. Specifically, the multiway valve may be arranged between the connection pipeline and the transporting pipeline. The multi-way valve is configured for selectively providing a flow of fluid, e.g., gas or liquid, from the wind turbine into the transporting pipeline, or that a flow of fluid through the transport pipe bypasses the wind turbine. Hence, the multiway valve may comprise a connection pipeline inlet for coupling the connection pipeline, a first valve inlet connected to a first flow side of the transporting pipeline and a second valve inlet connected to a second flow side of the transporting pipeline. Specifically, the multiway valve is interposed between the first flow side of the transporting pipeline and the second flow side of the transporting pipeline. Hence, if a leakage of the connection pipeline or the fluid generating unit is detected, the wind turbine and the respective electrolyzer unit can be bypassed, such that a fluid flow along the transporting pipeline from the first valve inlet to the second valve inlet is possible. Furthermore, if leakage is detected for example in the first flow side of the transporting pipeline, the flow of electrolyzed fluid can be controlled by the multiway valve such that the fluid, e.g., gas or liquid, flows through the connection pipeline to the second flow side of the transporting pipeline.

According to further exemplary embodiment, the wind turbine comprises a storage reservoir/tank being coupled to the fluid generating unit. The multiway valve is coupled to the fluid generating unit and the storage tank, wherein the multi-way valve is further configured for selectively providing a flow of fluid, e.g., gas or liquid, from the fluid generating unit to the storage tank, or a flow of fluid from the reservoir to the transporting pipeline. Hence, the multiway valve comprises a storage tank inlet which is coupled to the storage tank. For example, if the pressure in the transporting pipeline is higher than the gas pressure of the fluid, e.g., gas or liquid, the generated fluid can be guided into the storage tank such that the backflow from the transporting pipeline to the fluid generating unit can be prevented. However, if for example no gas is generated by the gas generating unit, stored gas in the storage tank can be injected into the transporting pipeline, if a respective necessary pressure drop between the storage tank and the transporting pipeline is detected.

The optional storage tank can be integrated in the turbine structure, e.g., the nacelle, the tower or the foundation of the wind turbine.

According to further exemplary embodiment, the multi-way valve is installed in the transporting pipeline in such a way that the multiway valve separates the transporting pipeline in a first flow side and a second flow side, wherein the multi-way valve is further configured for selectively providing a flow of fluid, e.g., gas or liquid, from the fluid generating unit to the first flow side of the transporting pipeline, and/or a flow of fluid from the fluid generating unit to the second flow side of the transporting pipeline.

According to further exemplary embodiment, the pressure control system comprises a pressure relieve valve installed in the transporting pipeline, wherein the pressure relieve valve is configured to relieve fluid, e.g., gas or liquid, if a predetermined pressure of the fluid in the transporting pipeline is exceeded, wherein the pressure control system in particular comprises a compensation reservoir coupled to the pressure relieve valve for receiving the fluid if a predetermined pressure of the fluid in the transporting pipeline is exceeded. Hence, if a critical pressure value in the transporting pipeline is detected, the fluid can be bled off in order to prevent damage of the transporting pipeline. Additionally, a compensation reservoir/tank can be coupled to the transporting pipeline, such that the bled off fluid, e.g., gas or liquid, can be stored and may be injected again in the transporting pipeline if the pressure value in the transporting pipeline falls below a certain limit. Hence, a loss of fluid can be prevented.

According to further exemplary embodiment, the system further comprises a further wind turbine for generating electrical power, wherein the further wind turbine comprises a fluid, e.g., gas or liquid, generating unit, e.g., an electrolyzer unit, configured for generating a fluid, e.g. gas or liquid, by using the generated electrical power. The further wind turbine is coupled by a further connection pipeline to the transporting pipeline in series for transporting the generated fluid. The pressure control system is further coupled to the fluid pipeline system for controlling the fluid flow of the fluid generated by the further wind turbine into the pipeline system. Hence, along the transporting pipeline, a plurality of fluid generating wind turbines can be coupled one after the other in series. Hence, a plurality of wind turbines can inject their generated fluid in one common transporting pipeline. The fluid pressure system thereby controls the supply of fluid by the wind turbines into the transporting pipeline, such that backflow back into the respective electrolyzer units can be prevented.

The described wind turbines with fluid, e.g., gas or liquid, producing capability may be connected in series, i.e., one gas string (transporting pipeline) between neighboring wind turbines, are directly coupled.

However, the described pipeline layout can be utilized for a full wind park, but also a cluster of wind turbines out of other clusters in a wind park, where the one or more other cluster can be inter-connected differently i.e., in a series connection. The wind part arrangement may further comprise a connecting hub, an energy collector station, an oil and gas production or collector platform, or an offshore substation.

According to further exemplary embodiment, the pressure control system comprises a transport non-return valve installed in the transporting pipeline between the wind turbine and the further wind turbine. Hence, the flow of fluid in the transporting pipeline between two adjacent wind turbines can be controlled and, if necessary, interrupted. For example, if leakage in the vicinity of one wind turbine is detected, the wind turbine can be isolated and decoupled from the transporting pipeline, wherein the other wind turbines can still inject the generated fluid into the transporting pipeline. Hence, it may not be necessary to shut down the complete generation of fluid, e.g., gas or liquid, in a wind park.

In some arrays of connected wind turbines there are placed one or more transport non-return valves which ensures the fluid flow in only one direction on the main staring. For example, the transport non-return valve ensures that a higher pressure in the main line does not cause the fluid to flow back into the wind turbine which may provide the fluid at a lower pressure, or in case of a leak the fluid would be prevented flowing back to the leak. The transport non-return valves valve ensures one flow in the pipe system. Thereby a fluid travelling backwards in the system is prevented and a flow in the right direction is ensured.

According to further exemplary embodiment, the pressure control system comprises a further transport non-return valve installed in the transporting pipeline between the wind turbine and the further wind turbine. Hence, the one transport non-return valves may be coupled to the transporting pipeline close to the first wind turbine and the further transport non-return valves may be coupled close to the downstream located second wind turbine. Hence, if a leakage occurs in the transporting pipeline between the transport non-return valves and the further transport non-return valve, the leaking section of the transporting pipeline between both transport non-return valves can be isolated and decoupled.

According to a further aspect, the wind park arrangement comprises a first system for transporting fluid generated by a wind turbine as described above and a second system for transporting fluid generated by a wind turbine as described above, and at least a main pipeline (functioning as central collector) to which the first transporting pipeline of the first system (and the second transporting pipeline of the second system are coupled in parallel. Hence, the first system comprising a plurality of wind turbines and the second system comprising a plurality of wind turbines can be coupled in parallel to one common main pipeline. In other words, a plurality of transporting pipelines of several systems can be coupled to one common main pipeline. Hence, if leakage in one system and one transporting pipeline, respectively, is detected, the pressure control system of the respective system may close the flow of fluid into the main pipeline and the system comprising the leaking transporting pipeline may be decoupled from the main pipeline and the other gas producing systems, respectively.

According to a further exemplary embodiment, the wind park arrangement comprises a bypass pipeline, wherein an end of the first transporting pipeline and an end of the second transporting pipeline are coupled to the bypass pipeline such that a flow of fluid between the first transporting pipeline and the second transporting pipeline is provideable. In particular, a bypass valve is installed between the bypass pipeline and at least one of the first transporting pipeline and the second transporting pipeline such that the flow of fluid between the first transporting pipeline and the second transporting pipeline is selectively adjustable. Hence, whereas respective ends of the transporting pipelines are coupled to the main pipeline, respective opposing ends of the respective transporting pipelines are coupled to the bypass pipeline. Hence, if leakage in one transporting pipeline of a leaking system is detected, a respective valve in the leaking transporting pipeline stops the flow of fluid into the main pipeline via the leaking section. Additionally, a further respective valve stops a flow of fluid into the leaking section of the transporting pipeline. Hence, if the leaking section is isolated from the transporting pipeline, a flow of fluid is provided to the bypass pipeline via non-leaking sections of the respective transporting pipeline. The bypass valve then allows the flow of fluid from the leaking system via the bypass pipeline into the other transporting pipeline of the non-leaking system. Hence, it is not necessary to isolate the complete system from the main pipeline such that the working sections of the leaking system may still provide a flow of fluid via the bypass line into the main pipeline.

According to further exemplary embodiment, the wind park arrangement further comprises a compressor unit coupled to the main pipeline. The optional compressor unit is coupled to the main pipeline for compressing the fluid in the main pipeline. Hence, in order to control the efficiency of the fluid transportation and in order to control the flow direction of the fluid in the main pipeline, one or a plurality of spaced compressors may be installed into the main pipeline. However, the fluid generating unit may be able to generate fluid, e.g., gas or liquid, with a sufficient pressure to deliver the fluid to the on-shore installation, so that it is not mandatory to provide respective compressors.

According to further exemplary embodiment, the wind park arrangement further comprises a third system as described above for transporting fluid generated by a wind turbine and a fourth system as described above for transporting fluid generated by a wind turbine, and at least a further main pipeline to which the third transporting pipeline of the third system and the fourth transporting pipeline of the fourth system are coupled in parallel. The main pipeline and the further main pipeline are coupleable by an interconnection pipe, wherein a main interconnection valve selectively adjusts a flow of gas between the main pipeline and the further main pipeline. Hence, if a leakage in one of the main pipes is detected, the leaking main pipe may be bypassed via the other main pipe.

Furthermore, the pressure control system comprises a central control unit to which all pressure control valves, respective pressure/leakage sensors and/or further control units for controlling the mass flow and the pressure of the fluid are coupled. Hence, by the control unit, a solution of digitally controlling a web of pressure regulators (pressure valves) on a wind park level is provided. A pressure loss in the wind park arrangement has a significant impact on the wind park arrangement efficiency. With intelligent operation of the pressure control system the pressure loss can be reduced to a minimum.

According to a further aspect of embodiments of the present invention, a method for providing a system for transporting fluid generated by a wind turbine is presented. The method comprises a coupling of a first pipeline section to the wind turbine. Furthermore, an assembly vessel is provided which comprises a second pipeline section. The method further comprises the pulling of a connection end of the first pipeline section to the assembly vessel. The connection end of the first pipeline section is coupled and connected to the second pipeline section by a connection element for forming a connected pipeline section. The connected pipeline section is released from the assembly vessel and the connected pipeline section is installed at the desired installation location.

Hence, by the above-described method, first of all the respective wind turbines are coupled with first pipeline section. The further pipeline sections and in particular pipeline ends of intermediate pipeline sections are for example preinstalled on the respective assembly vessel. Hence, the assembly vessel may drive to the wind turbine to be connected and raises the end of the first pipeline section to the surface and the assembly vessel, respectively. On the respective assembly vessel, the connection end of the first pipeline section is coupled to the intermediate pipeline section by the connection element. The connection element may be a jacket for liquid and gas tight connecting the two pipeline sections. After connecting the two pipeline sections with the connection element, the pipeline sections are lowered to the ground and to the desired installation location, respectively.

A fluid pipeline (e.g., for hydrogen or other gas) may be attached to an electrical cable under installation and burial in same assembly operation. The weight of the electrical cable will ensure sufficient ballast to the fluid pipeline and prevent it from floating to the surface away from the seabed. However, a completely separate fluid pipeline may also be used with measures to ensure that it does not float, e.g., a pipeline with weights spaced along its length on the seabed and/or ploughed into the seabed. Furthermore, a unified system is applied, wherein a cable-in-pipe system is utilized with an electrical cable shield by an outer pipe and wherein the space/cavity between the electrical cable and out shielding pipe is utilized for the fluid transport.

Also, only fluid pipe connected turbines can be used, i.e. turbines which do not excerpt power generated to an electrical grid, and accordingly electricity produced only utilized for the fluid producing equipment such as an electrolyser or other process equipment used either during or after the water electrolysis process. Most often at least one de-salination system is applied to prepare pure water (NaCl removal in particular) before the seawater interns the fluid generating unit. However, the system presented herein can transfer and export all types of energy gas.

Summarizing, embodiments of the present invention relates to an arrangement of a series of offshore installation, e.g., wind turbines. Such installations comprise at least one turbine with a fluid producing facility e.g., hydrogen producing equipment such as a gas generating unit, e.g. an electrolyzer unit. There may be other turbines in the offshore windfarm without such gas producing equipment (or support functions therefor). Embodiments of the present invention relates to a distribution system among such at least one gas producing wind turbines in a wind farm that utilizes different "primary" functions with dedicated equipment placed on individual turbines and then share such function (or product of such function) with the other turbines in the wind farm. Accordingly, all the wind turbines need not necessarily all have the same equipment installed but can depend on the supply from e.g., a neighbor turbine, to provide the one or more needed primary functions (or product of such function) that in total are required for gas production at an offshore facility. This provides a huge cost reduction instead of installing the same equipment on all gas producing turbines. Such primary function may be an electrolyzer, a de-salinator needed to purify salty seawater (to provide blue sweet water, e.g., free of NaCl) prior to the electrolysis process. Such equipment could be installed on a single turbine, (more if a big wind farm obviously unless it is dimensioned to supply all), which would then supply the one or more gas producing wind turbines equipped with an electrolyzer with the de-salinated water. Another primary function could be for instance be a gas purifier—such purifier may then be placed at another turbine that collects and purifies the gas received from other turbines prior to export and/or further gas processing on the same turbine or yet another turbine. By example, if the (optionally purified) hydrogen gas is to be further processed offshore to e.g., methane or ammonia in equipment designed for such purpose, this may happen on yet a third wind turbine installation. Other functions, that may be of a more secondary nature for gas production, could be compressed air for cleaning of gas pipes during maintenance, safety and control valves driven by compressed air. Similar, hydraulic power pack stations can be used for the control of the safety valves if not driven by electricity. Such safety valves may be placed at the offshore installation or placed at the seabed but with connection to the offshore installation.

In an embodiment most if not all of the wind turbines each comprise at least one electrolyzer unit. The above split of functions using single turbines as examples is equally applicable to clusters of turbines, i.e., one cluster of turbines (two or more) may represent one of the above turbines and thus within a cluster one (or more, but not all) primary function(s) (or product thereof) is used for at specific purpose in the chain of gas production. This has the advantage, from a service perspective, that service and maintenance can be done on multiple turbines located close to one another (time saving) and can be done fairly quick as there is less travelling distance; and a crew of specialist for a given primary function and/or dedicated service vessel with dedicated spare-parts and equipment (vs multiple spare-parts and specialist) can be assigned to a given cluster (cost saving). For this purpose, a special cable arrangement is proposed, which integrates pipes for the transport of the primary functions (or products thereof) with/into the gas connection pipe installed between the gas producing installations and further on to e.g., an onshore facility such as gas storage tanks. At least the pipeline that connects the individual turbines in the array (in series or in parallel) has a multi-purpose function, but not necessarily the same function(s) in such connection pipeline throughout the wind farm. The bundle can thus be individualized depending on the needed function(s) between two connection points. The bundle may also include communication lines, auxiliary power supply lines either supplied by a wind turbine generator and/or a battery backup as well as cables that are used to monitor the health of the bundle.

The aspects defined above and further aspects of embodiments of the present invention are apparent from the examples of embodiment to be described hereinafter and are explained with reference to the examples of embodiment.

Embodiments of the invention will be described in more detail hereinafter with reference to examples of embodiment but to which the invention is not limited.

BRIEF DESCRIPTION

Some of the embodiments will be described in detail, with reference to the following figures, wherein like designations denote like members, wherein.

DETAILED DESCRIPTION

Figure 1:
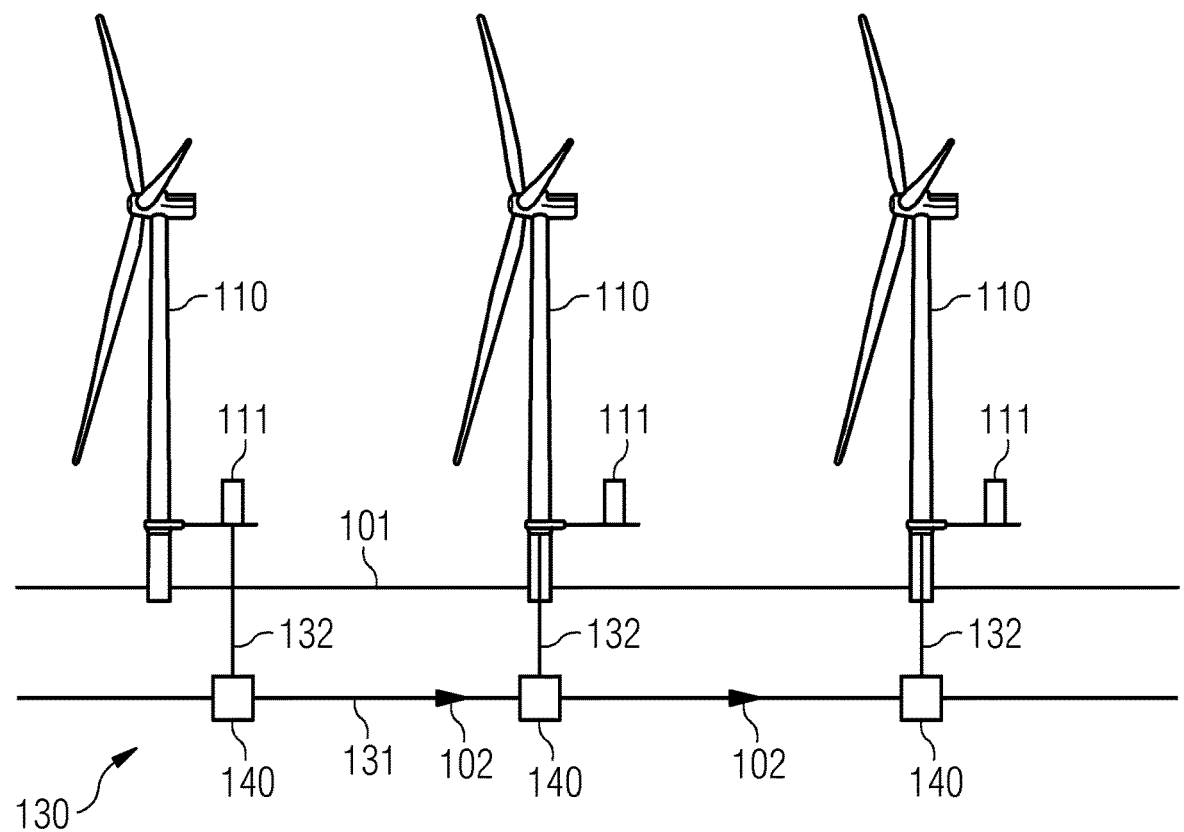
FIG. 1 illustrates a schematic view of wind turbines having a fluid (gas) generating unit, e.g., an electrolyzer unit, and being coupled to a transporting pipeline according to an exemplary embodiment.

The illustrations in the drawings are schematically. It is noted that in different figures, similar or identical elements are provided with the same reference signs.

FIG. 1 shows a wind turbine 110 having fluid (gas) producing unit 111, e.g., an electrolyzer unit 111, and being coupled to a transporting pipeline 131 according to an exemplary embodiment. The electrolyzer unit 111 is configured for generating an electrolyzed fluid (gas) by using the generated electrical power. The system further comprises a fluid (gas) pipeline system 130 coupled to the wind turbine 110 for transporting the generated electrolyzed gas, and a pressure control system 140 coupled to the gas pipeline system 130 for controlling the fluid flow of the electrolyzed gas in the pipeline system. The pipeline system 130 comprises a transporting pipeline 131 and a connection pipeline 132, wherein the connection pipeline 132 is coupled to the wind turbine 110 and the connection pipeline 132 such that the electrolyzed gas is transportable from the wind turbine 110 to the transporting pipeline 131 via the connection pipeline 132.

The electrolyzer unit 111 is fed by an educt, such as water, and produces by the use of the electrical power generated by the wind turbine 110 respective electrolyzed gas, such as hydrogen and oxygen. The educt may be provided by supplying pipelines or, e.g., in case of water as educt, from the sea/lake/river or the groundwater. Specifically, the electrolyzer unit 110 generates a first electrolyzed gas, such as hydrogen, which is transported by the pipeline. As shown in the exemplary embodiment in FIG. 1, the wind turbines 110 are offshore wind turbines which are connected to a transporting pipeline 131 being arranged under a sealable 101 on a ground. The connection pipelines 132 couple the electrolyzer unit 111 and the transporting pipeline 131.

The pressure control system 140 controls the flow of the electrolyzed gas to the connection pipeline 132 and to the transportation pipeline 131. For example, if the mass flow and hence the pressure of the electrolyzed gas varies, the pressure control system 140 controls for example the pressure in the connection pipeline 132 or the transporting pipeline 131 such that a desired flow direction 102 of electrolyzed gas is provided. In particular, a backflow of electrolyzed gas back to the electrolyzer unit 111 may be for example prevented.

The further wind turbines 110 are coupled by respective further connection pipelines 132 to the transporting pipeline 131 in series for transporting the generated electrolyzed gas.

The pressure control system 140 is further coupled to the gas pipeline system 130 for controlling the fluid flow 102 of the electrolyzed gas generated by the further wind turbines 110 into the pipeline system. Hence, along the transporting pipeline 131, a plurality of electrolyzed gas generating wind turbines 110 can be coupled one after the other in series. Hence, a plurality of wind turbines 110 can inject their generated electrolyzed gas in one common transporting pipeline 131. The gas pressure system 140 thereby controls the supply of electrolyzed gas by the wind turbines 110 into the transporting pipeline 131, such that backflow back into the respective electrolyzer units can be prevented.

Figure 2:
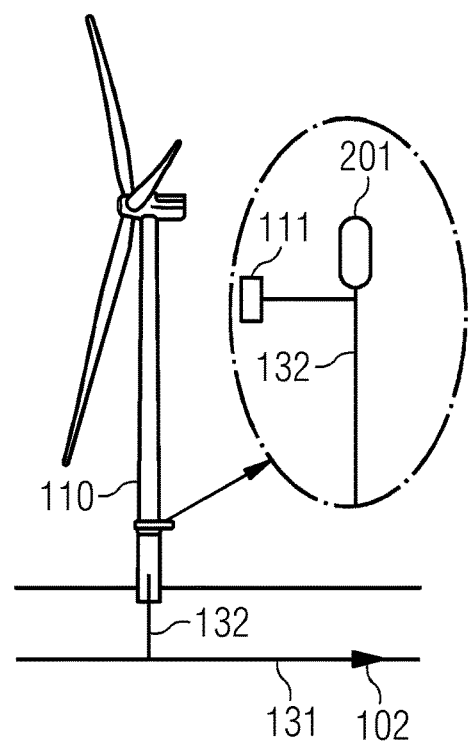
FIG. 2 illustrates a schematic view of a wind turbine having a pressurized equalization tank according to an exemplary embodiment.

FIG. 2 illustrates a schematic view of a wind turbine 110 having a pressurized equalization tank 201 according to an exemplary embodiment. The equalization tank 201 is coupled to the connection pipeline 132, such that the pressure of the electrolyzed gas be controlled and adjusted to the pressure of the transporting pipeline 131.

The pressurized equalization tank 201 is open for electrolyzed gas if there is too much pressure. The accumulator tank 201 is installed on each of the gas producing turbines 110 to reduce the peak pressure on the system (chock absorber).

Figure 3:
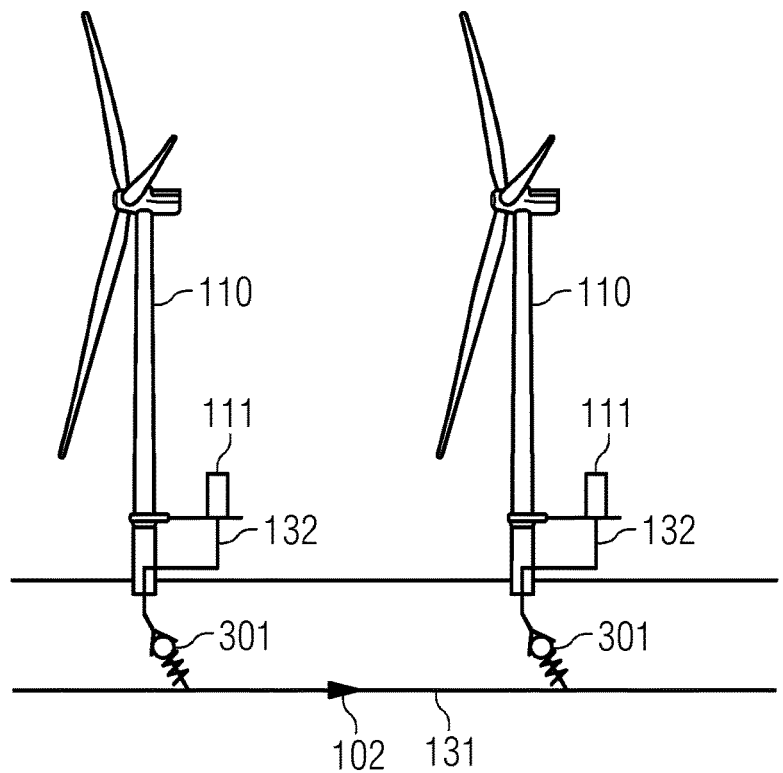
FIG. 3 illustrates a schematic view of wind turbines being coupled to a transporting pipeline and having a fluid (gas) control valve according to an exemplary embodiment.

FIG. 3 illustrates a schematic view of wind turbines 110 being coupled to a transporting pipeline 131 and having a gas control valve 301 according to an exemplary embodiment.

The gas control valve 301 is installed in the connection pipeline 132 for controlling the flow 102 of the electrolyzed fluid, wherein the gas control valve 301 is in particular a non-return valve. By installing the gas control valve 301 in the connection pipeline 132, i.e. between the electrolyzer unit 111 and the transporting pipeline 131, for example the mass flow and the pressure of the first electrolyzed gas flowing into the transporting pipeline 131 can be reduced or increased. Hence, a backflow of the electrolyzed gas to the wind turbine 110 can be prevented.

Figure 4:
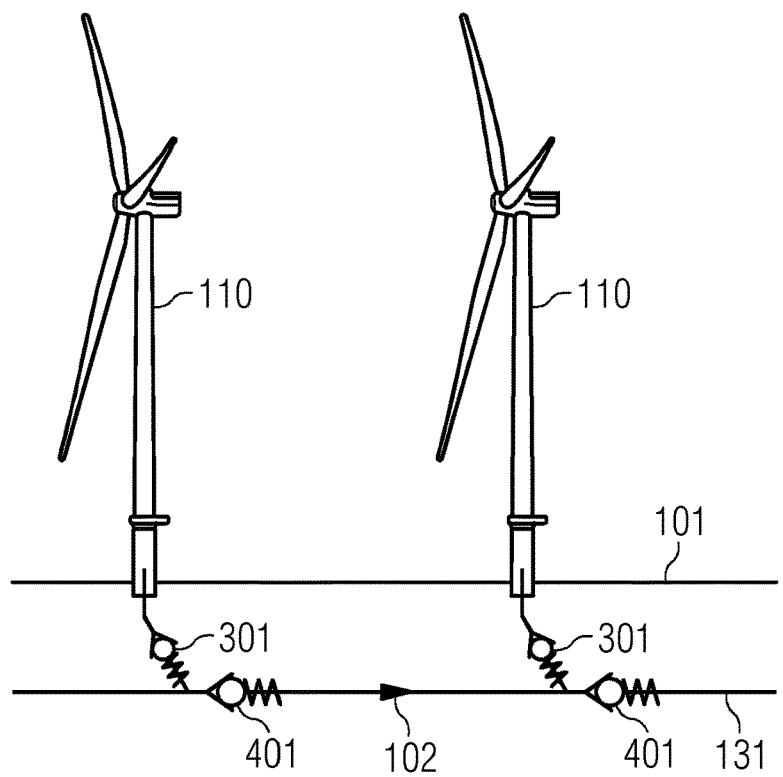
FIG. 4 illustrates a schematic view of wind turbines being coupled to a transporting pipeline having a transport non-return valve according to an exemplary embodiment.
Figure 5:
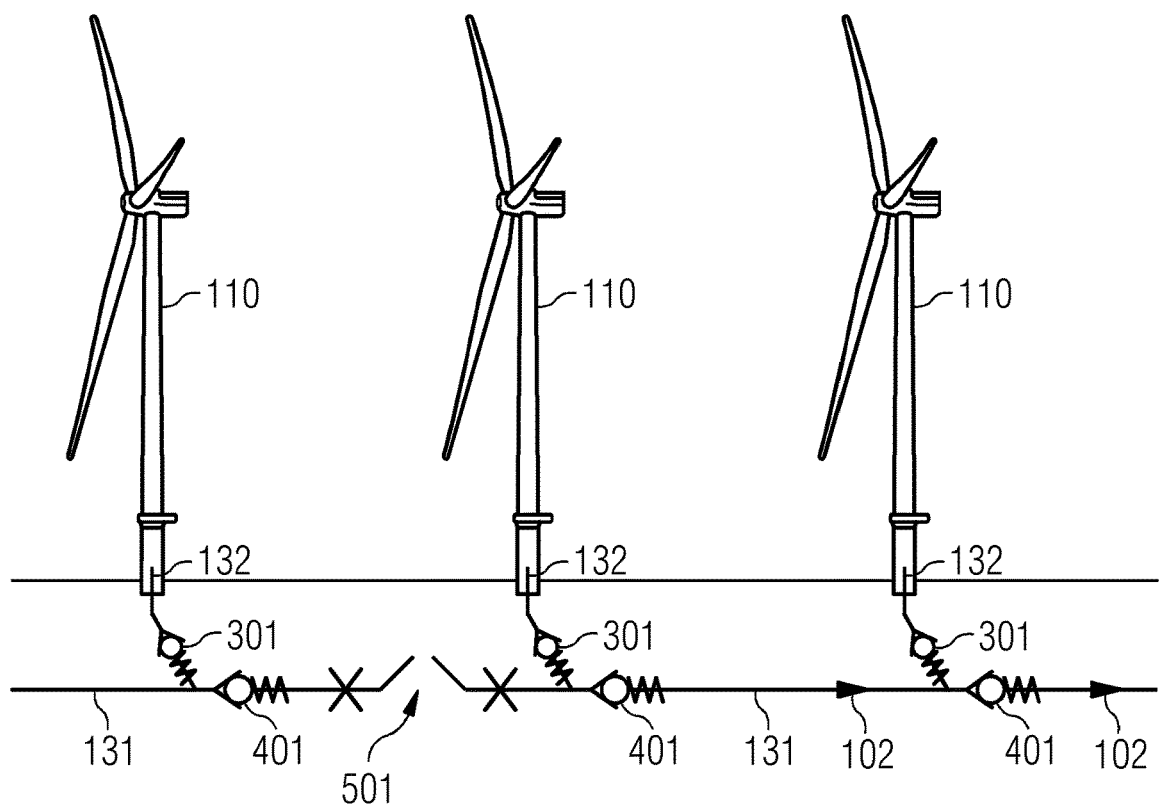
FIG. 5 illustrates a schematic view of wind turbines being coupled to a transporting pipeline having a leakage between two wind turbines according to an exemplary embodiment.

FIG. 4 illustrates a schematic view of wind turbines 110 being coupled to a transporting pipeline 131 having a transport non-return valve 401 according to an exemplary embodiment. FIG. 5 illustrates the embodiment shown in Fig. fear, wherein in FIG. 5 a leakage 501 in the transporting pipeline 131 is shown. The transport non-return valve 401 is installed in the transporting pipeline 131 between the left wind turbine 110 and the middle wind turbine 110. Hence, the flow of electrolyzed gas in the transporting pipeline 131 between two adjacent wind turbines 110 can be controlled and, if necessary, interrupted. For example, if leakage 501 in the vicinity of left wind turbine 110 and middle wind turbine 110 is detected, both wind turbine 110 can be isolated and decoupled from the transporting pipeline 131, wherein the right wind turbine 110 can still inject the generated electrolyzed gas into the transporting pipeline 131 such that the fluid flow 102 in the transporting pipeline 131 away from the leakage 501 is possible.

Figure 6:
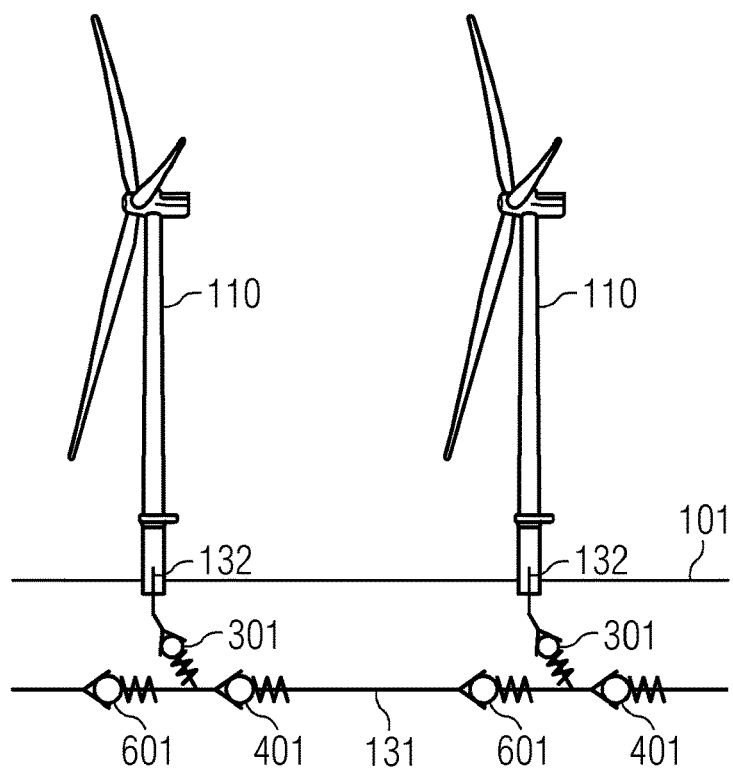
FIG. 6 illustrates a schematic view of wind turbines being coupled to a transporting pipeline having two transport non-return valve between two wind turbines according to an exemplary embodiment.
Figure 7:
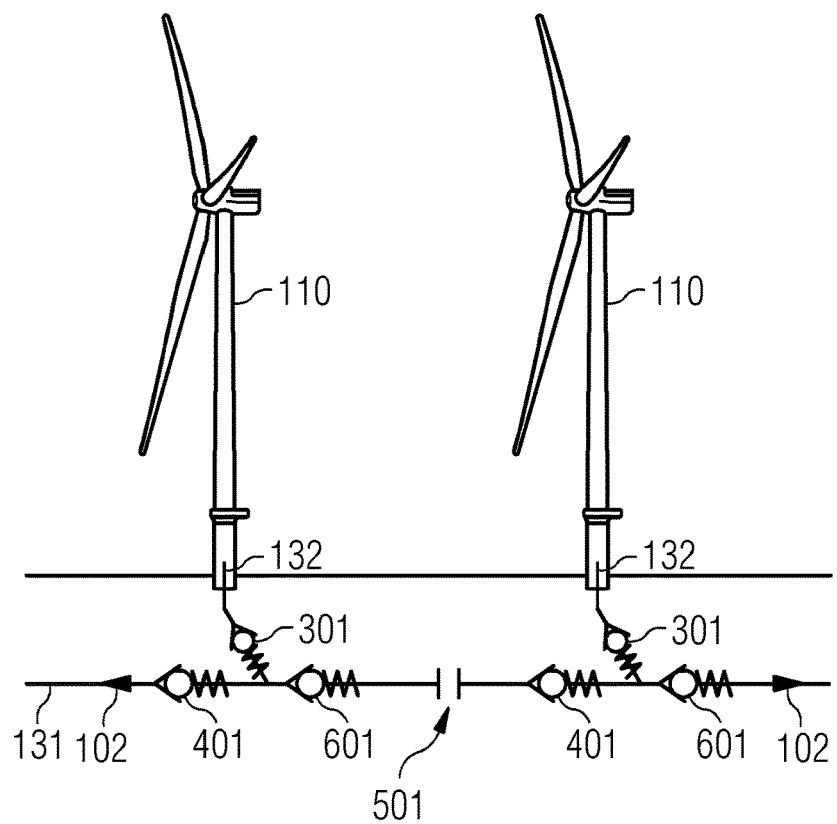
FIG. 7 illustrates a schematic view of wind turbines being coupled to a transporting pipeline having two transport non-return valves and a leakage between the two non-return valves according to an exemplary embodiment.

FIG. 6 illustrates a schematic view of wind turbines 110 being coupled to a transporting pipeline 131 having two transport non-return valve 401, 601 between two adjacent wind turbines 110 according to an exemplary embodiment. FIG. 7 illustrates a schematic view of wind turbines 100 according to FIG. 6 being coupled to a transporting pipeline 131 having two transport non-return valves 401, 601 and a leakage between the two non-return valves 401, 601 according to an exemplary embodiment. Hence, the one transport non-return valve 401 may be coupled to the transporting pipeline 131 close to the right wind turbine 110 and the further transport non-return valve 601 may be coupled close to the left wind turbine 110. Hence, if a leakage 501 occurs in the transporting pipeline 131 between the transport non-return valve 401 and the further transport non-return valve 601, the leaking section 501 of the transporting pipeline 131 between both transport non-return valves 401, 601 can be isolated and decoupled. Hence, both wind turbines 110 may still produce electrolyzed gas which flows along the flow direction 102 to in a direction away from the intermediate leakage 501.

Figure 8:
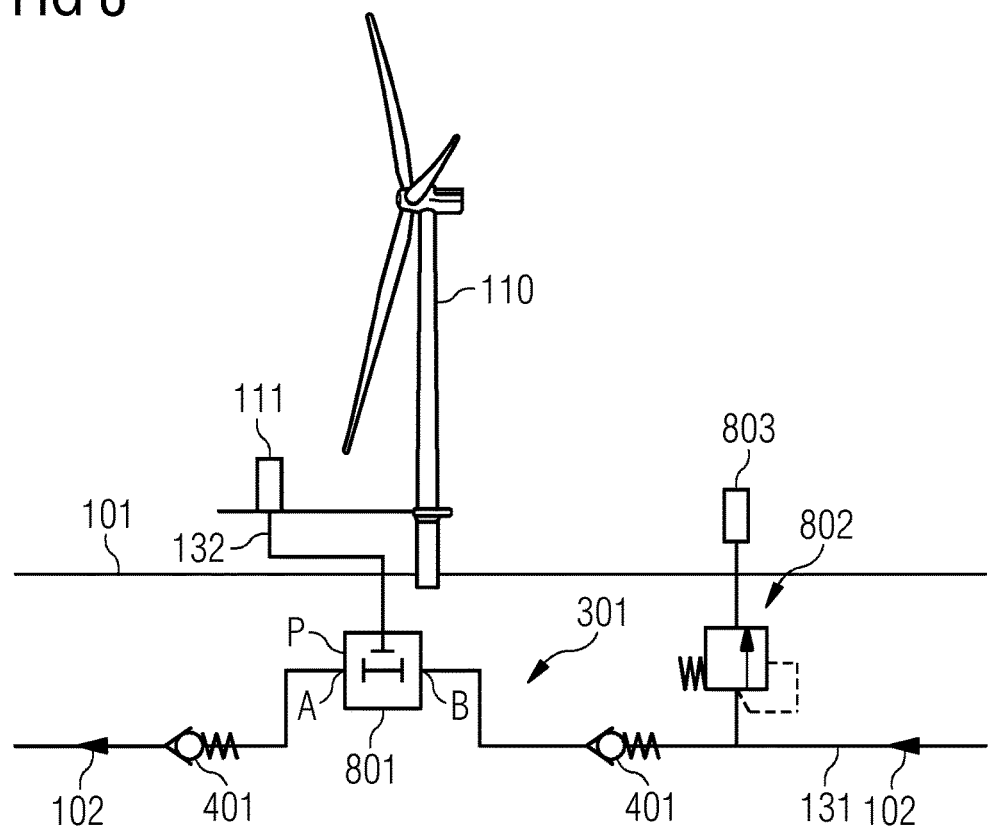
FIG. 8 illustrates a schematic view of a wind turbine system having a multiway way valve and a compensation reservoir according to an exemplary embodiment.

FIG. 8 illustrates a schematic view of a wind turbine system having a multiway way valve 801 and a compensation reservoir 803 according to an exemplary embodiment.

the pressure control system 140 comprises a pressure relieve valve 802 installed in the transporting pipeline 131, wherein the pressure relieve valve 802 is configured to relieve electrolyzed gas if a predetermined pressure of the electrolyzed gas in the transporting pipeline 131 exceeds a predetermined value. Furthermore, the pressure control system 140 in particular comprises a compensation reservoir 803 coupled to the pressure relieve valve 802 for receiving the electrolyzed gas if a predetermined pressure of the electrolyzed gas in the transporting pipeline 131 is exceeds a predetermined limit. Hence, if a critical pressure value in the transporting pipeline 131 is detected, the electrolyzed gas can be bled off in order to prevent damage of the transporting pipeline 131. The compensation reservoir 803 can be coupled to the pressure relieve valve 802, such that the bled off electrolyzed gas can be stored and may be injected again in the transporting pipeline 131 if the pressure value in the transporting pipeline 131 falls below a certain limit. Hence, a loss of electrolyzed gas can be prevented.

The pressure control system 140 further comprises a multi-way valve 801, wherein the multi-way valve 801 is coupled to the transporting pipeline 131 and the wind turbine 110. Specifically, the multiway valve 801 is arranged between the connection pipeline 132 and the transporting pipeline 131. The multi-way valve 801 is configured for selectively providing a flow of electrolyzed gas from the wind turbine 110 into the transporting pipeline 131, or that a flow of fluid through the transporting pipeline 131 bypasses the wind turbine 110. Hence, the multiway valve 801 comprises a connection pipeline inlet P for coupling the connection pipeline 132, a first valve inlet A connected to a first flow side of the transporting pipeline 131 and a second valve inlet B connected to a second flow side of the transporting pipeline 132. Specifically, the multiway valve 801 is interposed between the first flow side of the transporting pipeline 131 and the second flow side of the transporting pipeline 131. Hence, if a leakage of the connection pipeline 132 or the electrolyzer unit 111 is detected, the wind turbine 110 and the respective electrolyzer unit 111 can be bypassed, such that a fluid flow along the transporting pipeline 131 from the first valve inlet A to the second valve B inlet is possible.

Figure 9:
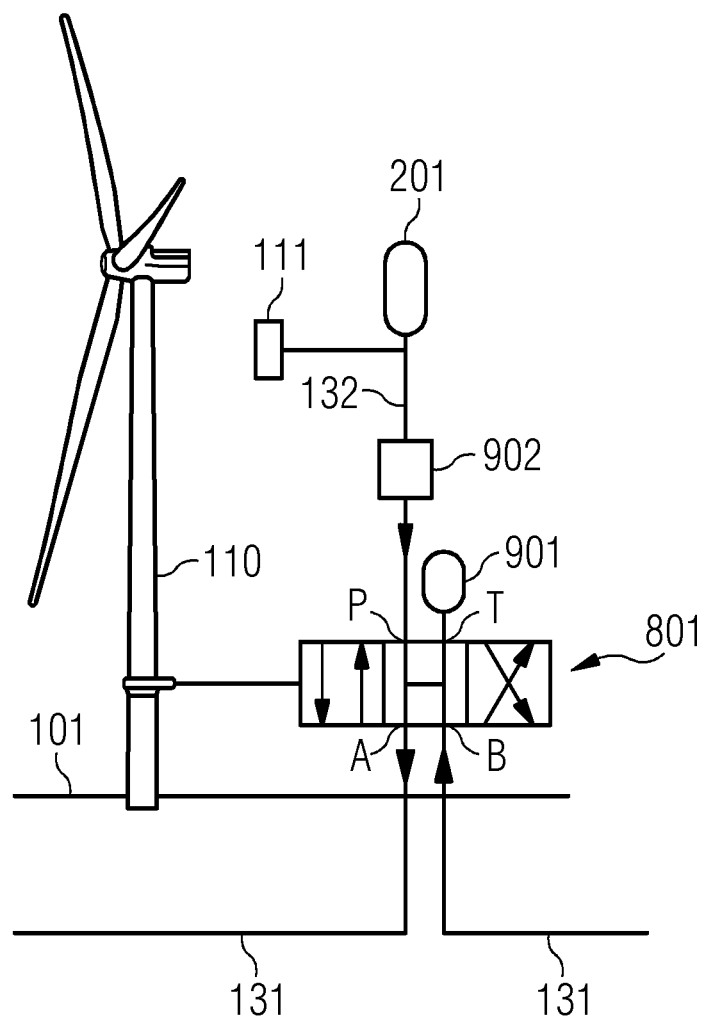
FIG. 9 illustrates a schematic view of a wind turbine system having a multiway way valve and a storage tank according to an exemplary embodiment.

FIG. 9 illustrates a schematic view of a wind turbine system 110 having a multi-way way valve 801 and a storage tank 901 according to an exemplary embodiment. The storage reservoir/tank 901 is coupled to the electrolyzer unit 111. The multiway valve 801 is coupled to the electrolyzer unit 111 and the storage tank 901, wherein the multi-way valve 801 is further configured for selectively providing a flow of electrolyzed gas from the electrolyzer unit 111 to the storage tank 901, or a flow of electrolyzed gas from the storage tank 901 to the transporting pipeline 131. Hence, the multiway valve 901 comprises a storage tank inlet T which is coupled to the storage tank 901. For example, if the pressure in the transporting pipeline 131 is higher than the gas pressure of the electrolyzed gas in the connection pipeline 132, the generated electrolyzed gas can be guided into the storage tank 901 such that the backflow from the transporting pipeline to the electrolyzer unit 111 can be prevented. However, if for example no electrolyzed gas is generated by the electrolyzer unit 111, stored gas in the storage tank 901 can be injected into the transporting pipeline 131, if a respective necessary pressure drop between the storage tank 901 and the transporting pipeline 131 is detected.

The multiway valve 801 is installed in the transporting pipeline 131 in such a way that the multiway valve 801 separates the transporting pipeline 113 in a first flow side and a second flow side, wherein the multi-way valve 801 is further configured for selectively providing a flow of electrolyzed gas from the electrolyzer unit 111 to the first flow side (e.g., via first valve inlet A) of the transporting pipeline, and/or a flow of electrolyzed gas from the electrolyzer unit 111 to the second flow side (e.g., via second valve inlet B) of the transporting pipeline 131.

Furthermore, a control valve 902 is shown which is coupled in the connection pipeline 132. The control valve 902 controls the flow of the electrolyzed gas from the electrolyzer unit 111 either to the multiway valve 801 or to the pressure equalization tank 201.

Figure 10:
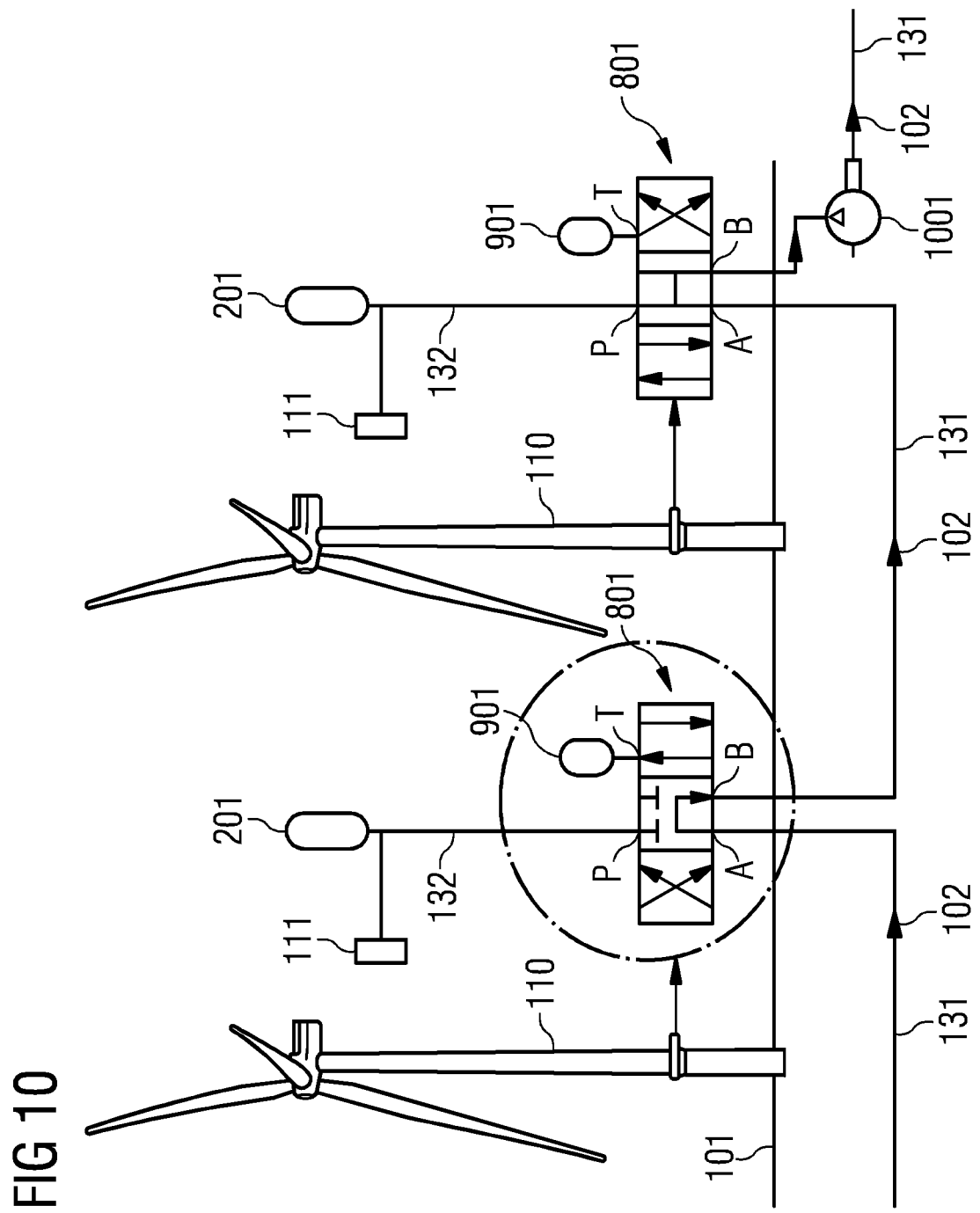
FIG. 10 illustrates a schematic view of a wind turbine system with two wind turbines having a multiway way valve and transporting pipeline compressor according to an exemplary embodiment.
Figure 11:
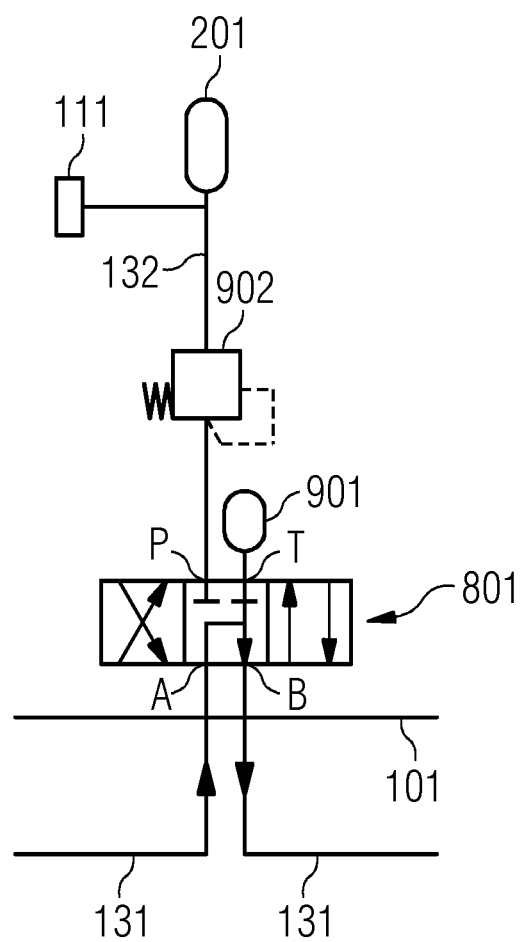
FIG. 11 illustrates a schematic view of a multiway valve providing a flow between a reservoir tank and the transporting pipeline according to an exemplary embodiment.

FIG. 10 and FIG. 11 illustrates a schematic view of a wind turbine system with two wind turbines 110 having respective multiway way valves 801 and a transporting pipeline compressor 1001 according to an exemplary embodiment. The system shown in FIG. 10 is similar to the system shown in FIG. 9. In FIG. 11, a schematical view of the multiway valve 801 providing a flow between a reservoir tank 901 and the transporting pipeline 131 is shown.

In FIG. 10, the left wind turbine 110 comprises an electrolyzer unit 111 coupled to a connection pipeline inlet P via the connection pipeline 132. Furthermore, the storage tank 901 is coupled via the storage tank inlet T to the multiway valve 801. Furthermore, the left side of the transporting pipeline 131 is coupled to the multiway valve 801 via the first valve inlet A and the right side of the transporting pipeline 131 is coupled to the second valve B of the multiway valve 801. The multiway valve 801 is adjusted in such a way, that a flow 102 of the electrolyzed gas from the first valve inlet A to the second valve inlet B is available. However, the storage tank inlet T and the connection pipeline inlet P are decoupled from the transporting pipeline 131. Hence, the left turbine 110 is bypassed such that no electrolyzed gas flows between the transporting pipeline 131 on the one side and the electrolyzer 111 or the storage tank 901 on the other side.

Furthermore, the right wind turbine 110 comprises an electrolyzer unit 111 coupled to a connection pipeline inlet P via the connection pipeline 132. Furthermore, the storage tank 901 is coupled via the storage tank inlet T to the multiway valve 801. Furthermore, the left side of the transporting pipeline 131 is coupled to the multiway valve 801 via the first valve inlet A and the right side of the transporting pipeline 131 is coupled to the second valve B of the multiway valve 801. The multiway valve 801 is adjusted in such a way, that a flow 102 of the electrolyzed gas from the first valve inlet A to the second valve inlet B is available. Furthermore, the electrolyzed gas from the electrolyzer unit 111 of the right wind turbine 110 is injected via the connection pipeline inlet P into the transporting pipeline 131.

In FIG. 11, the electrolyzer unit 111 and the pressure equalization tank 201 are decoupled by the setting of the multiway valve 801. Instead, the multiway valve 801 is adjusted such that electrolyzed gas stored in the storage tank 901 is injected via the storage tank inlet T into the transporting pipeline 131.

Figure 12:
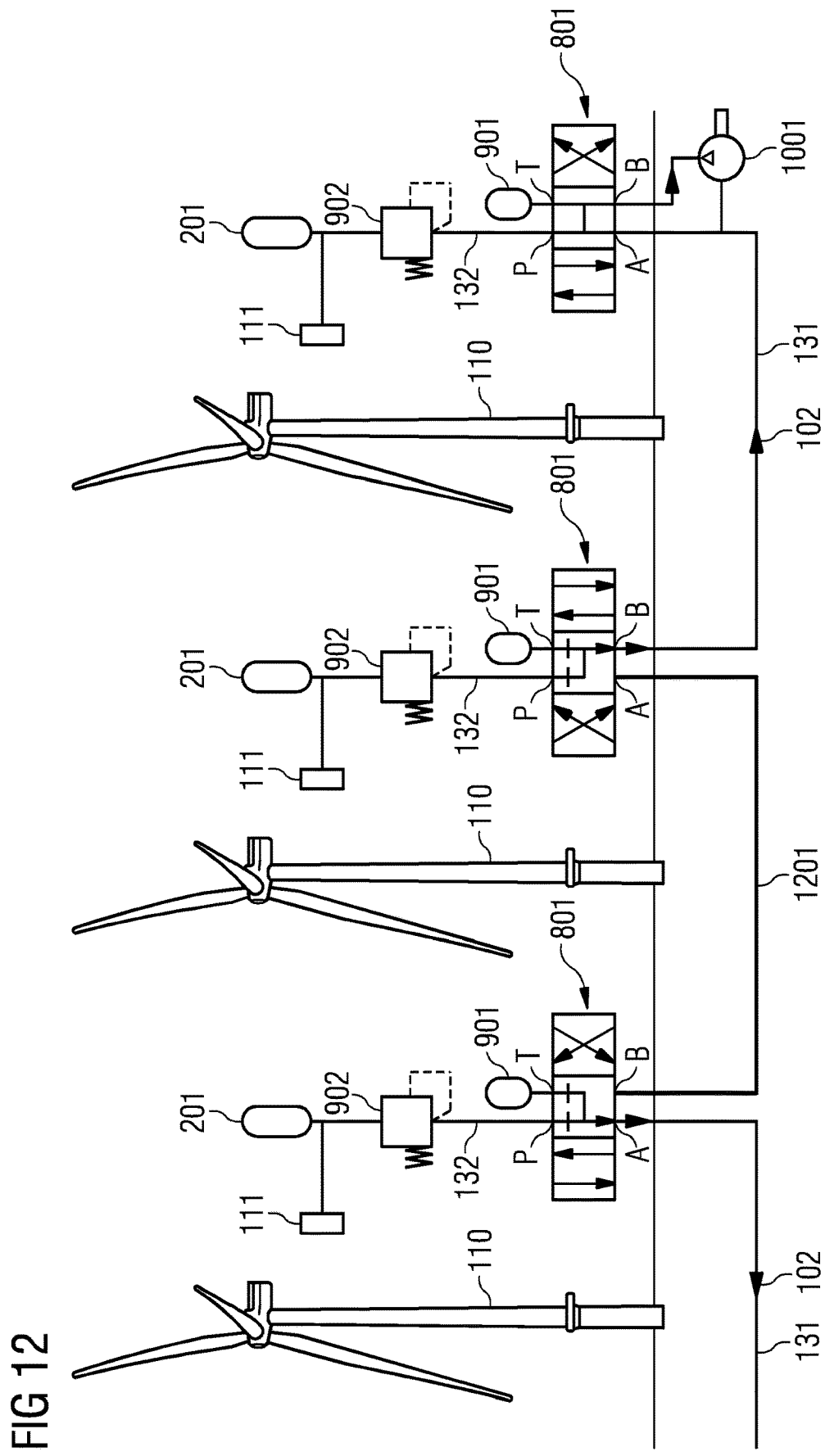
FIG. 12 illustrates a schematic view of a wind turbine system with three wind turbines having multiway way valves, wherein a leaking section of the transporting pipeline is isolated according to an exemplary embodiment.

FIG. 12 illustrates a schematic view of a wind turbine system with three wind turbines 110 having multiway way valves 801, wherein a leaking section 1201 of the transporting pipeline 131 is isolated. The wind turbines 110 are equipped and configured similar to the wind turbine 110 shown in FIG. 9.

In the exemplary embodiment, the leaking transporting pipeline section 1201 is coupled to the second valve inlet B of the multiway valve 801 of the left wind turbine 110 and to the first valve inlet A of the multiway valve 801 of the middle wind turbine 110. Since a leakage in the leaking transporting pipeline section 1201 has been detected, the multiway valve 801 of the left wind turbine 110 closes the second valve inlet B and directs the electrolyzed gas from the electrolyzer unit 111 and/or from the storage tank 901 via the first valve inlet A into the transporting pipeline 131. The multiway valve 801 of the middle wind turbine 110 closes the first valve inlet A and directs the electrolyzed gas from the electrolyzer unit 111 and/or from the storage tank 901 via the second valve inlet B into the transporting pipeline 131. Hence the leaking transporting pipeline section 1201 is isolated and bypassed such that all wind turbines can still produce and transport electrolyzed gas.

Furthermore, in order to control the pressure in the transporting pipeline 131, a transporting pipeline compressor 1001 can be installed.

Figure 13:
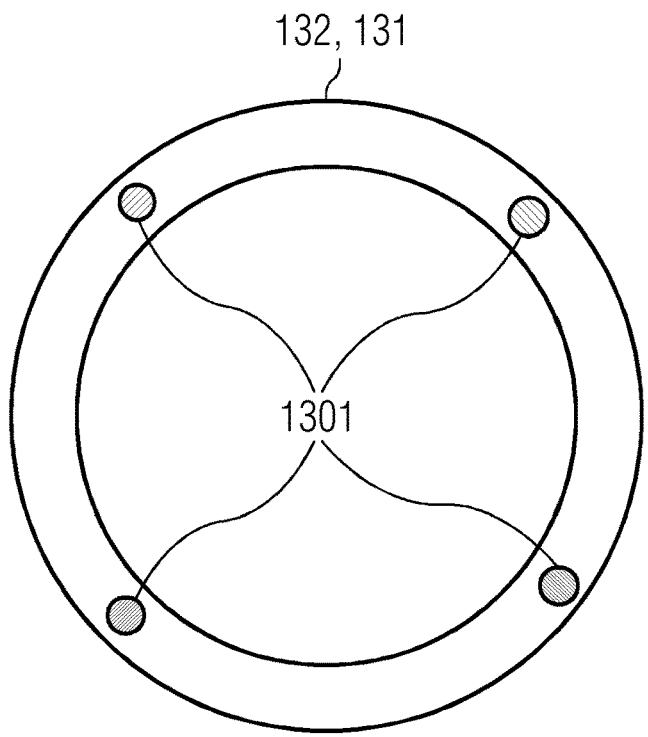
FIG. 13 illustrates schematic views of pipelines including supply lines according to an exemplary embodiment.
Figure 14:
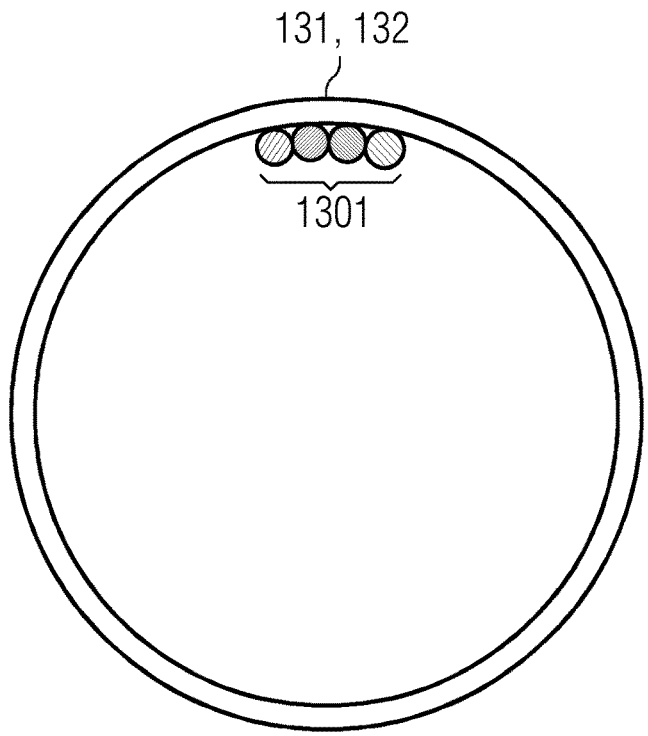
FIG. 14 illustrates schematic views of pipelines including supply lines according to an exemplary embodiment.

FIG. 13 and FIG. 14 illustrate schematic views of pipelines 131, 132 including supply lines 1301 according to an exemplary embodiment. The supply lines 1301 can be for example supply lines 1301 for transporting electrical power and/or for transporting signals, such as control signals to or from the wind turbine 110. Additionally, supply lines 1301 may supply required fluid or gas required by the wind turbine 110. The supply lines 1301 can be integrated in the surrounding pipeline material or pipeline wall as shown in FIG. 13. Furthermore, the supply lines 1301 can be fixed to the inner surfaces of the pipeline 131, 132 can be taken from FIG. 14.

The supply lines 1301 may be auxiliary supply lines to the turbines 110, auxiliary supply lines to subsea equipment such as gas compressors for pressure step-up, auxiliary supply lines for sweet water for the Hydrogen electrolyzer unit and/or auxiliary supply lines for communication and monitoring of pipeline by e.g., fibre optic.

Figure 15:
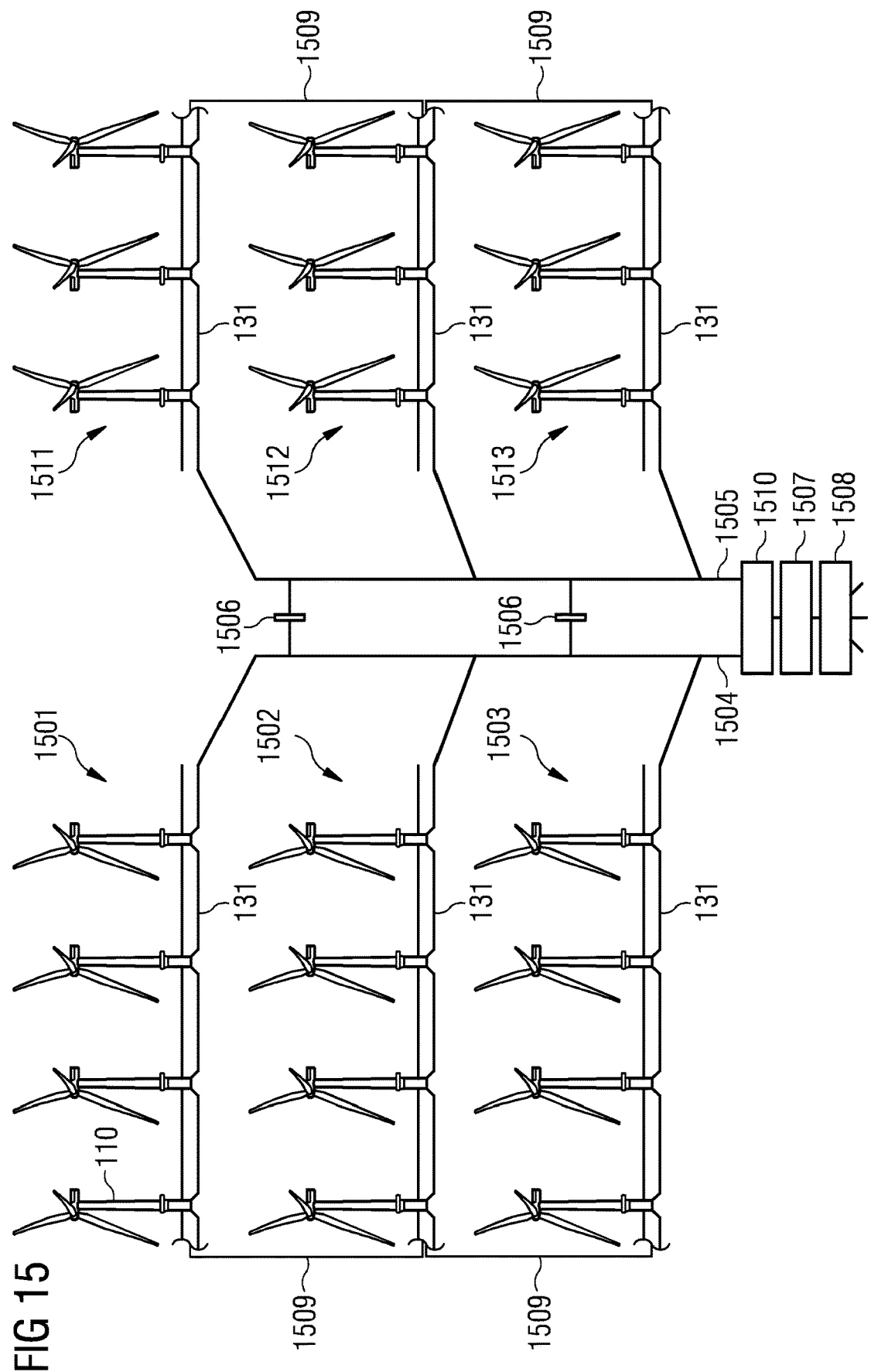
FIG. 15 illustrates a schematic view of a wind park arrangement comprising a plurality of systems of wind turbines coupled to a main pipeline and a further main pipeline according to an exemplary embodiment.

FIG. 15 illustrates a schematic view of a wind park arrangement comprising a plurality of systems 1501, 1502, 1503, 1511, 1512, 1513 of wind turbines 110 coupled to a main pipeline 1504 and a further main pipeline 1505 according to an exemplary embodiment.

For example, the wind park arrangement comprises at least the first system 1501 for transporting electrolyzed gas generated by a wind turbine 110 as described above and a second system 1502 for transporting electrolyzed gas generated by a wind turbine 110 as described above, and at least the main pipeline 1504 to which the first transporting pipeline 131 of the first system 1501 and the second transporting pipeline 131 of the second system 1502 are coupled in parallel. Hence, the first system 1501 comprising a plurality of wind turbines 110 and the second system 1502 comprising a plurality of wind turbines 110 can be coupled in parallel to one common main pipeline 1504. In other words, a plurality of transporting pipelines 131 of several systems 1501, 1502, 1503, 1511, 1512, 1513 can be coupled to one common main pipeline 1504, 1505. Hence, if leakage in one system 1501, 1502, 1503, 1511, 1512, 1513 and one respective transporting pipeline 131, respectively, is detected, the pressure control system 140 of the respective system 1501, 1502, 1503, 1511, 1512, 1513 may close the flow of fluid into the main pipeline 1504, 1505 and the system 1501, 1502, 1503, 1511, 1512, 1513 comprising the leaking transporting pipeline 131 may be decoupled from the main pipeline 1504, 1505 and the other gas producing systems 1501, 1502, 1503, 1511, 1512, 1513, respectively.

The first main pipeline 1504 and the second main pipeline 1505 run in parallel with respect to each other. Additionally, the main pipeline 1504 and the further main pipeline 1505 are coupleable by an interconnection pipe, wherein a main interconnection valve 1506 selectively adjusts a flow of electrolyzed gas between the main pipeline 1504 and the further main pipeline 1505. A plurality of further interconnection pipes with respective interconnection valves 1506 can be provided between the respective main pipes 1504, 1505 such that a leaking section of the respective main pipe 1504, 1505 between two interconnection pipes can be bypassed via the other main pipe 1505, 1504.

Furthermore, bypass pipelines 1509 are shown, wherein an end of the first transporting pipeline 131 of the first system 1501 and an end of the second transporting pipeline 131 of a second system 1502 are coupled by a respective bypass pipeline 1509 such that a flow of electrolyzed gas between the first transporting pipeline 131 and the second transporting pipeline 131 is providable.

The main pipelines 1504, 1505 may end in an offshore substation 1510. The offshore substation 1510 forms a subsea connection hub which is feeding gas from array pipelines 1504, 1505 to an export pipeline and to shore or energy island in the connection grid. To the offshore substation 1510, a storage substation 1507 may be coupled, wherein the generated electrolyzed gas can be gathered and e.g., stored. The gathered electrolyzed gas can be transported from the storage substation 1507 to an onshore substation 1508. From the onshore substation 1508 the electrolyzed gas can be further transported to several desired destinations meeting the electrolyzed gas. The onshore substation 1508 may be a delivery point, such as an onshore gas network, onshore production facility or an onshore storage.

Figure 16:
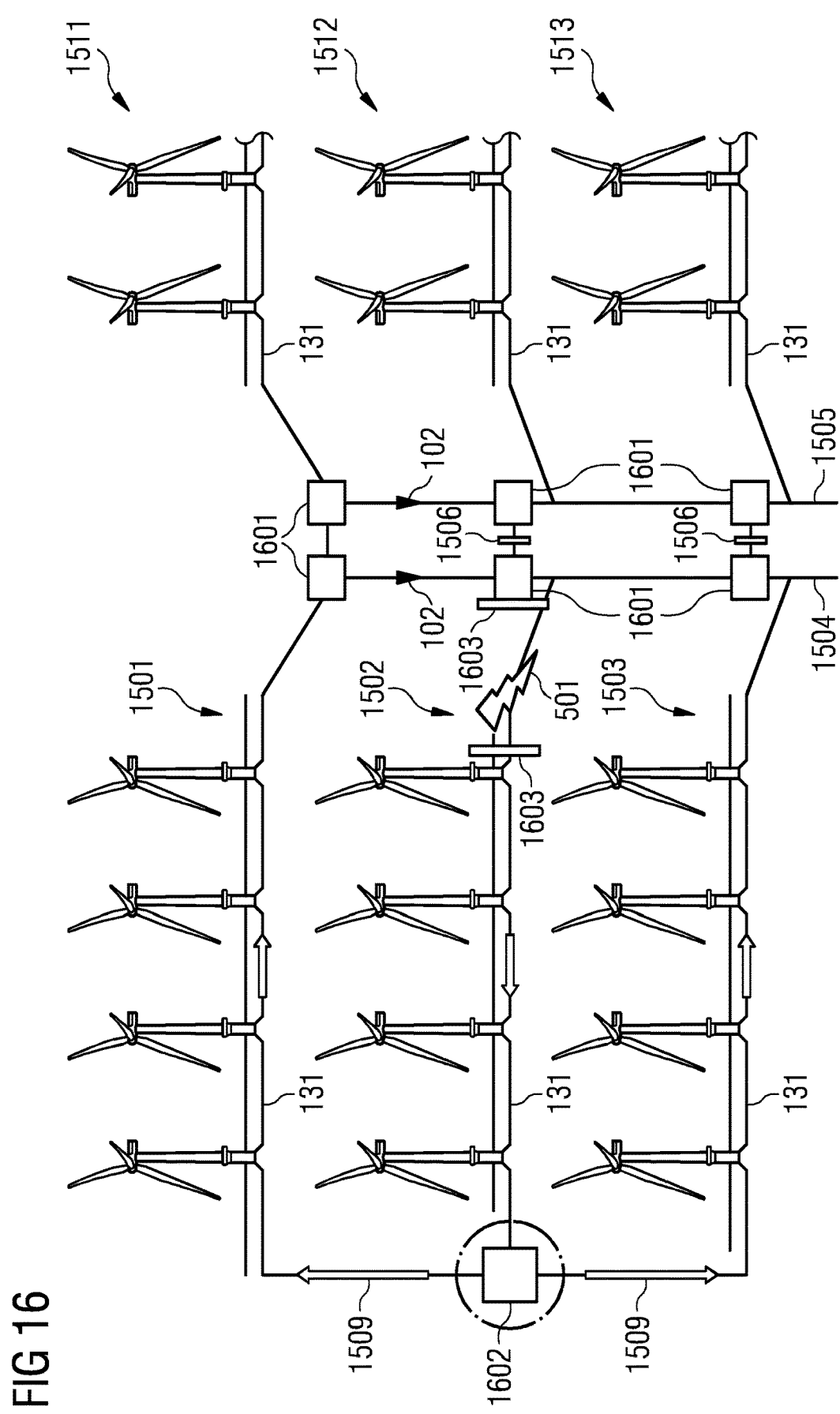
FIG. 16 illustrates a schematic view of a wind park arrangement comprising a plurality of systems of wind turbines coupled to a main pipeline and a further main pipeline having respective compressor units according to an exemplary embodiment.

FIG. 16 illustrates a schematic view of a wind park arrangement comprising a plurality of systems 1501, 1502, 1503, 1511, 1512, 1513 of wind turbines 110 coupled to a respective main pipeline 1504 and a further main pipeline 1505 having respective compressor units 1601. The compressor units 1601 are coupled to the main pipelines 1504, 1505 for compressing the electrolyzed gas. Hence, in order to control the efficiency of the gas transportation and in order to control the flow direction 102 of the electrolyzed gas in the main pipelines 1504, 1505, one or a plurality of spaced compressors 1601 may be installed.

Furthermore, a bypass valve 1602 is installed between the bypass pipeline 1509 and at least one of the first transporting pipeline 131 and the respective second transporting pipeline 131 of the wind turbine systems 1501, 1502, 1503 such that the flow of electrolyzed gas between the first transporting pipeline 131, the second transporting pipeline and the third sporting pipeline 131 of the respective systems 1501, 1502, 1503 is selectively adjustable. Hence, whereas respective ends of the transporting pipelines 131 are coupled to the main pipeline 1504, respective opposing ends of the respective transporting pipelines 131 are coupled to the bypass pipelines 1509. Hence, if leakage in one transporting pipeline 131 of a leaking system (e.g., leaking system 1502 in the example shown in FIG. 16) is detected, control valves 1603 in the leaking transporting pipeline 131 stops the flow of electrolyzed gas into the main pipeline 1504 via the leaking section. Additionally, a further respective valve 1503 stops a flow of electrolyzed gas into the leaking section of the transporting pipeline 131. Hence, if the leaking section is isolated from the transporting pipeline 131, a flow of electrolyzed gas is provided to the bypass pipeline 1509 via non-leaking sections of the respective transporting pipeline 131 of the second system 1502. The bypass valve 1602 then allows the flow of electrolyzed gas from the leaking system 1502 via the bypass pipeline 1509 into the other transporting pipeline 131 of the non-leaking systems 1501, 1503. Hence, it is not necessary to isolate the complete leaking system 1502 from the main pipeline 1504 such that the working sections of the leaking system 1502 may still provide a flow of electrolyzed gas via the bypass line 1509 into the main pipeline 1504.

Figure 17:
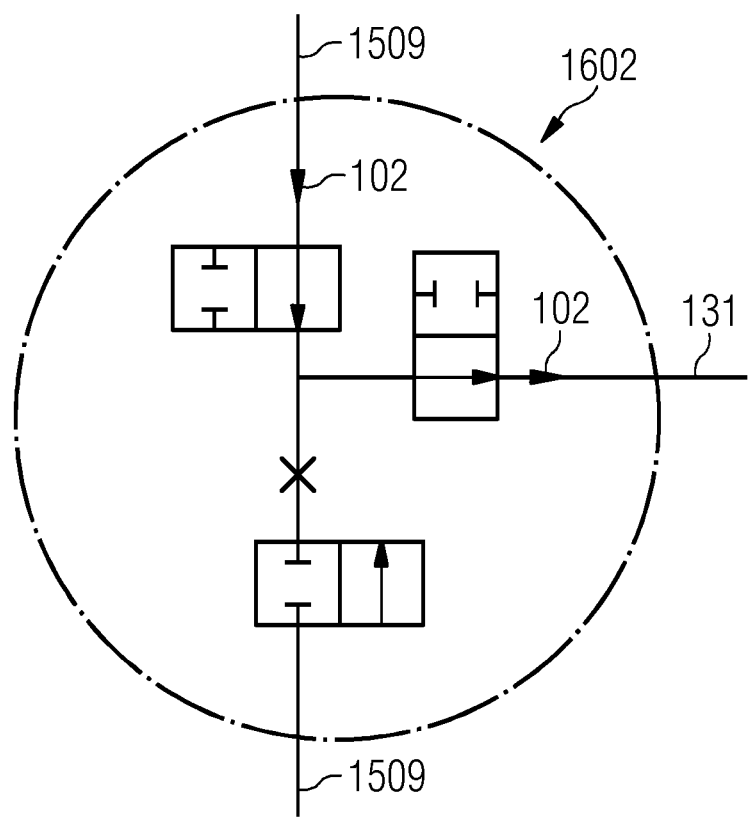
FIG. 17 illustrates a schematic view of a bypass valve according to an exemplary embodiment.

FIG. 17 illustrates a schematic view of a bypass valve 1602 as shown in FIG. 16. in the exemplary configuration of the bypass valve 1602, the gas flow 100 to misguided from an upper bypass pipeline 1509 to the transporting pipeline 131 of a working, non-leaking system 1501, 1502, 1503, 1511, 1512, 1513. However, the bypass pipeline 1509 to which a leaking system 1501, 1502, 1503, 1511, 1512, 1513 is coupled, is decoupled by the bypass valve 1602.

Figure 18:
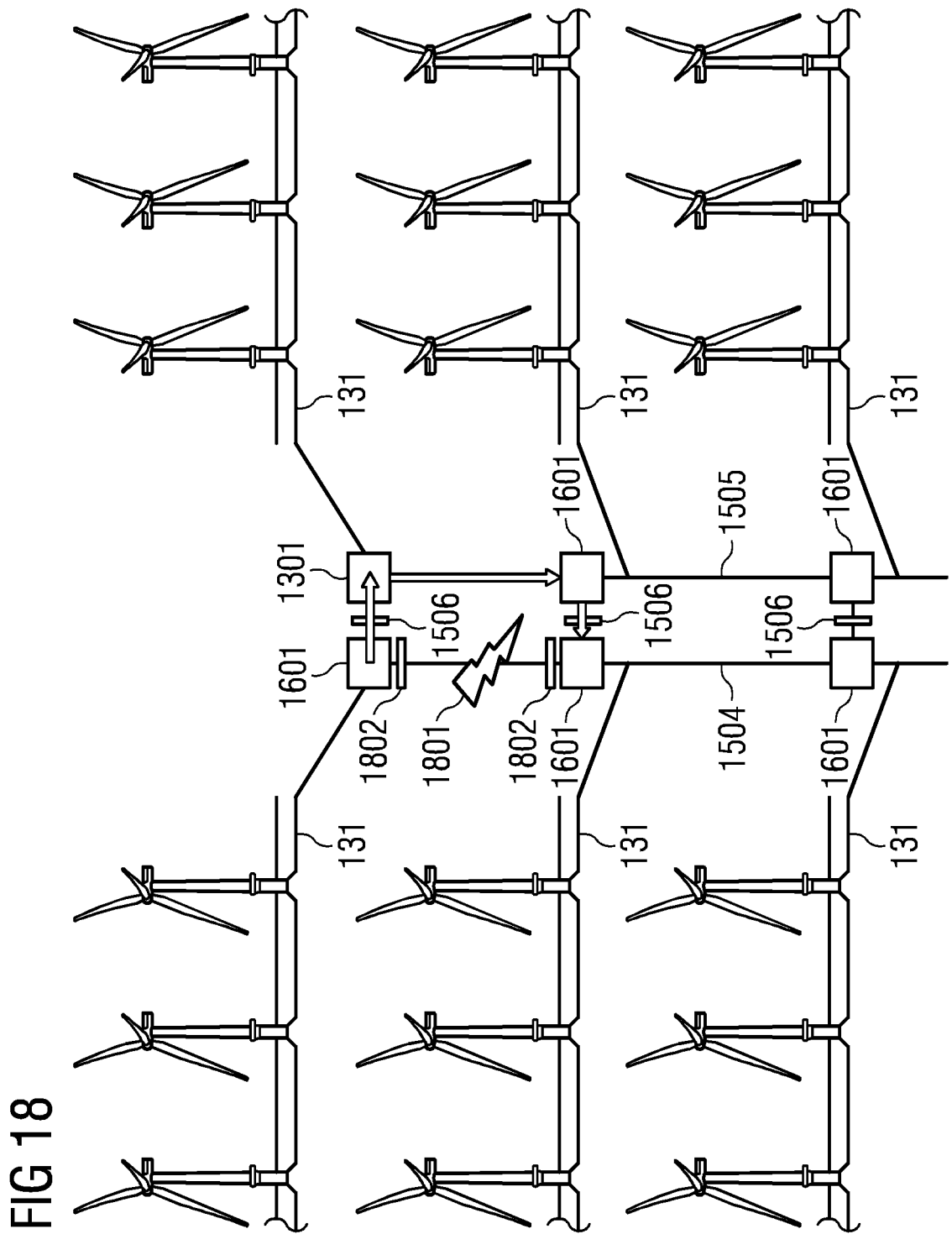
FIG. 18 illustrates a schematic view of a wind park arrangement comprising two systems of wind turbines coupled to a main pipeline and a further main pipeline being controlled by main pipeline control valves according to an exemplary embodiment.

FIG. 18 illustrates a schematic view of a wind park arrangement comprising a plurality of systems 1501, 1502, 1503, 1511, 1512, 1513 of wind turbines coupled to main pipelines 1504, 1505 similar to the exemplary embodiment shown in FIG. 15. in the exemplary embodiment, a leakage section 1801 of one main pipeline 1504 exist. Hence, respective control valves 1802 of the main pipeline 1504 that are located upstream and downstream of the leakage section 1801 of the main pipeline 1504 close the flow through the leakage section 1801. Respective interconnection valves 1506 in an interconnection pipe between the main pipeline 1504 and the further main pipeline 1505 arranged upstream and downstream of the isolated leakage section 1801 of the main pipeline 1504. Hence, the leakage section by guiding the 1801 can be bypassed electrolyzed gas via the further main pipeline 1505. In order to control the fluid flow more efficiently, a plurality of compressor units 1601 are arranged along the main pipeline 1504 and the further main pipeline 1505.

The system automatically detects a pressure drop on the main pipeline 1505 and close this leaking section. 1801. There is pressure control and flow monitoring to detect any leaking gasses. To ensure continuous production the gas is routed around the defect pipeline. This runs until the pipeline 1504 is repaired.

FIG. 19 to FIG. 23 illustrates schematic views of method steps for connecting two pipeline sections for an offshore wind turbine 110 for transporting electrolyzed gas.

Figure 19:
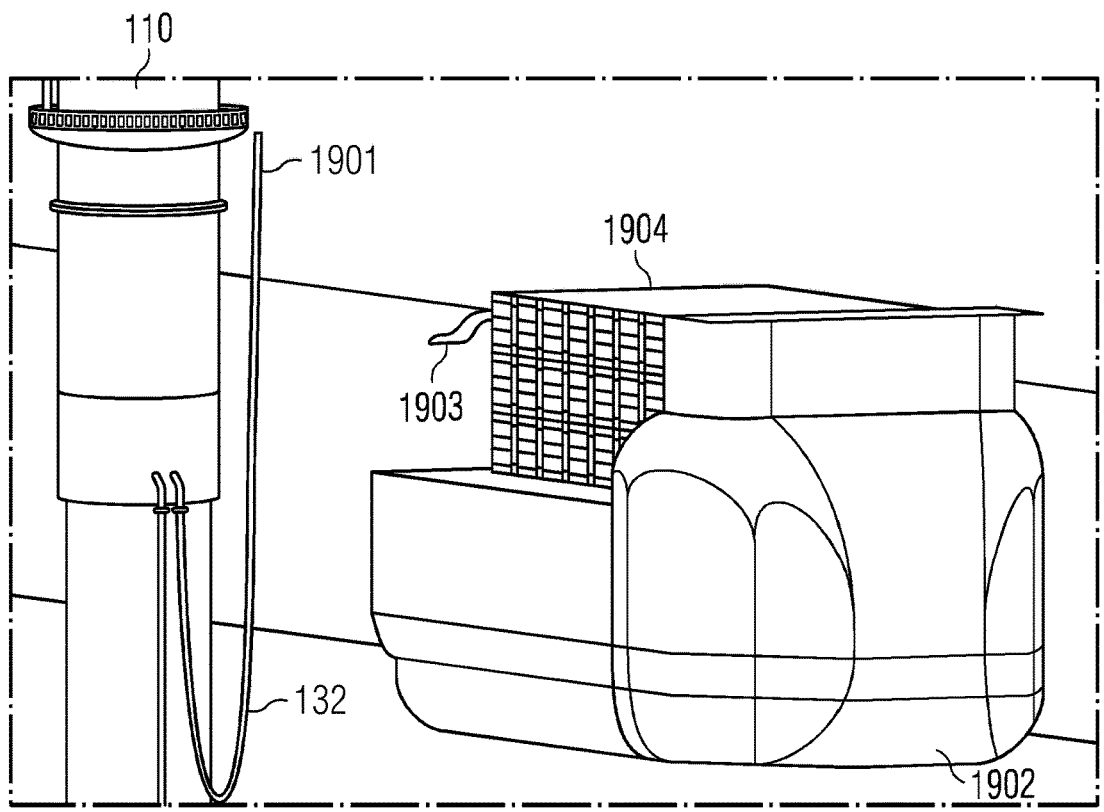
FIG. 19 illustrates schematic views of method steps for connecting two pipeline sections for an offshore wind turbine according to an exemplary embodiment illustrates.

As can be seen in FIG. 19, a first pipeline section 1901 is coupled to the wind turbine 110. The first pipeline section 1901 may be the connection pipeline 132 as described above. Furthermore, an assembly vessel 1902 is provided which comprises a second pipeline section 1903. The second pipeline section 1903 may be stored in a storage container 1904, since the second pipeline section may be made of a flexible rollable material. Alternatively, the assembly vessel 1902 comprises a plurality of stored connection elements 2100 which are configured for coupling to pipeline sections 1901, 1903.

Figure 20:
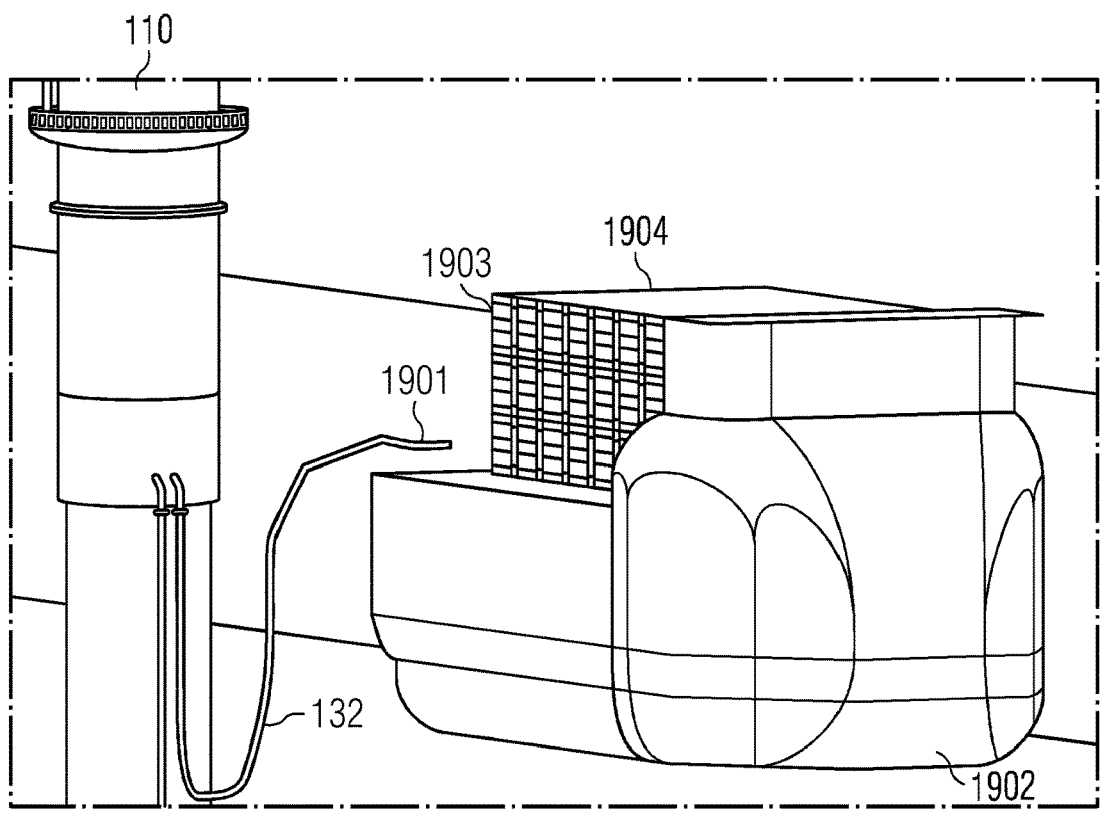
FIG. 20 illustrates schematic views of method steps for connecting two pipeline sections for an offshore wind turbine according to an exemplary embodiment.

As can be seen in FIG. 20 a connection end of the first pipeline section 1901 is pulled on deck of the assembly vessel 1902 for the further processing.

Figure 21:
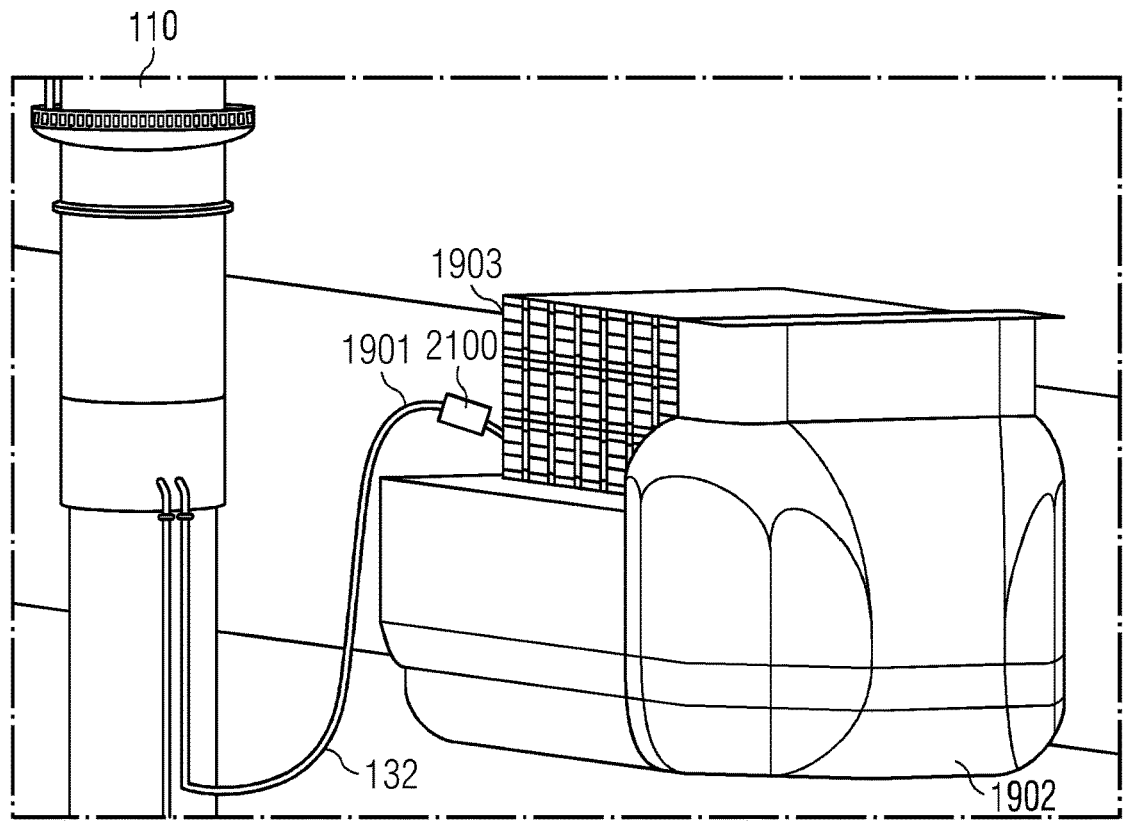
FIG. 21 illustrates schematic views of method steps for connecting two pipeline sections for an offshore wind turbine according to an exemplary embodiment.

As can be seen in FIG. 21, the connection end of the first pipeline section 1901 is coupled and connected to the second pipeline section 1903 by a connection element 2100 for forming a connected pipeline section.

Figure 22:
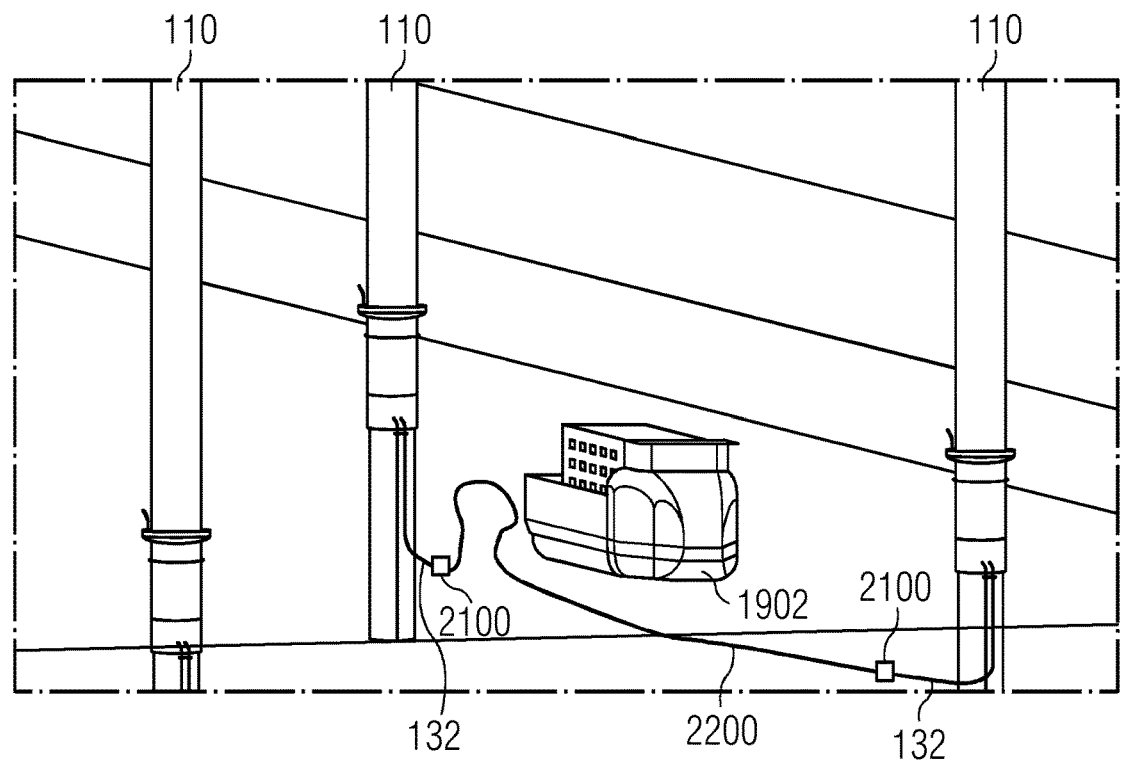
FIG. 22 illustrates schematic views of method steps for connecting two pipeline sections for an offshore wind turbine according to an exemplary embodiment.

As can be seen in FIG. 22, the connected pipeline section is released from the assembly vessel 1902 and the connected pipeline section is installed at the desired installation location. As shown in FIG. 22 an intermediate pipeline section 2200 is connected between two connecting pipelines 132. The intermediate pipeline section 2200 is coupled by a respective connection element 2100 to the connecting pipelines 132. Additionally, the respective control valve may be integrated in the connection element 2100.

Figure 23:
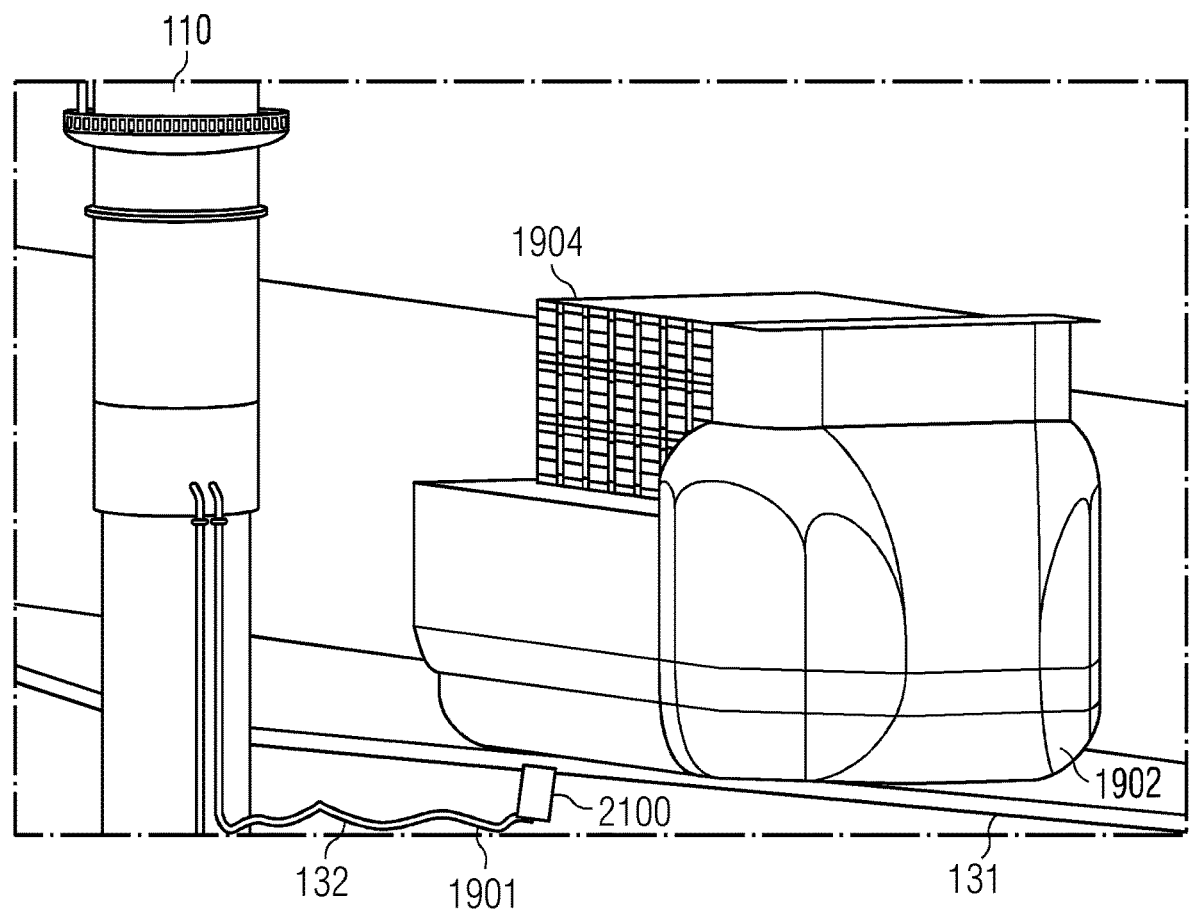
FIG. 23 illustrates schematic views of method steps for connecting two pipeline sections for an offshore wind turbine according to an exemplary embodiment.

FIG. 23 shows a further exemplary embodiment, wherein the connection element 2100 connects the first pipeline section 1901 of a connection pipeline 132 to a further pipeline section formed by the transporting pipeline 131. According to the method, the transporting pipeline 131 and the first pipeline section 1901 may be pulled on deck of the assembly vessel 1902 such that on deck of the assembly vessel 1902 the connection element 2100 can be coupled. The connection element 2100 may additionally include a multiway valve 801 as described above. After assembling the pipeline 131, 132, the respective pipeline assembly is lowered to the ground and to the cited installation location, respectively. Hence, to the pre-installed pipe (e.g., the connection pipeline 132) on a foundation joint of the wind turbine 110 a coupling main array pipe (e.g., the transporting pipeline 131) collecting the gas from the complete array. The main array pipe (e.g., the transporting pipeline 131) can be preinstalled and laid on the ground. For assembling, the main array pipe is then taken up on board of the assembly vessel 1902 for jointing to the turbine connection pipe (e.g., the connection pipeline 132). Sufficient pipe overlength of the connection pipeline 132 and/or transporting pipeline 131 have to be stored at the seabed in the lifting zone. For example, the respective pipe 131, 132 forms due to its overlength an omega shape (Ω) on the ground (seabed).

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A system for transporting fluid generated by a wind turbine, the system comprising,
at least one wind turbine for generating electrical power, wherein the wind turbine comprises a fluid producing unit configured for generating a fluid by using the generated electrical power,
 a fluid pipeline system coupled to the wind turbine for transporting the generated electrolyzed fluid, and
 a pressure control system coupled to the fluid pipeline system for controlling the fluid flow of the fluid in the pipeline system,
wherein the pipeline system comprises a transporting pipeline and a connection pipeline, wherein the connection pipeline is coupled to the wind turbine and the transporting pipeline such that the fluid is transportable from the wind turbine to the transporting pipeline via the connection pipeline, wherein the pressure control system comprises a multi-way valve, wherein the multi-way valve is coupled to the transporting pipeline and the wind turbine, and wherein the multi-way valve is configured for selectively providing a flow of fluid from the wind turbine into the transporting pipeline, or that a flow of fluid through the transporting pipeline bypasses the wind turbine.

2. The system according to claim 1,
wherein the pressure control system comprises a fluid control valve installed in the connection pipeline for controlling the flow of the electrolyzed fluid,
wherein the fluid control valve is a non-return valve.

3. The system according to claim 1,
wherein the wind turbine comprises a storage tank being coupled to the fluid producing unit,
wherein the multi-way valve is coupled to the fluid producing unit and the storage tank,
wherein the multi-way valve is further configured for selectively providing
 a flow of fluid from the fluid producing unit to the storage tank, or
 a flow of fluid from the reservoir to the transporting pipeline.

4. The system according to claim 1,
wherein the multi-way valve is installed in the transporting pipeline in such a way that the multi-way valve separates the transporting pipeline a first flow side and a second flow side,
wherein the multi-way valve is further configured for selectively providing
 a flow of fluid from the fluid producing unit to the first flow side of the transporting pipeline, and/or
 a flow of fluid from the fluid producing unit to the second flow side of the transporting pipeline.

5. The system according to claim 1,
wherein the pressure control system comprises a pressure relief valve installed in the transporting pipeline,
wherein the pressure relief valve is configured to relieve fluid if a predetermined pressure of the fluid in the transporting pipeline is exceeded,
wherein the pressure control system comprises a compensation reservoir coupled to the pressure relief valve for receiving the fluid if a predetermined pressure of the fluid in the transporting pipeline is exceeded.

6. The system according to claim 1, further comprising
a further wind turbine for generating electrical power,
wherein the further wind turbine comprises a fluid producing unit configured for generating a fluid by using the generated electrical power,
wherein the further wind turbine is coupled by a further connection pipeline to the transporting pipeline in series for transporting the generated fluid, and
wherein the pressure control system is further coupled to the fluid pipeline system for controlling the fluid flow of the fluid generated by the further wind turbine into the pipeline system.

7. The system according to claim 6,
wherein the pressure control system comprises a transport non-return valve installed in the transporting pipeline between the wind turbine and the further wind turbine.

8. The system according to claim 7,
wherein the pressure control system comprises a further transport non-return valve installed in the transporting pipeline between the wind turbine and the further wind turbine.

9. A wind park arrangement, based on the system according to claim 1, comprising a first system and a second system for transporting fluid generated by the wind turbine, and at least a main pipeline to which a first transporting pipeline of the first system and a second transporting pipeline of the second system are coupled in parallel.

10. The wind park arrangement according to claim 9, further comprising a bypass pipeline wherein an end of the first transporting pipeline and an end of the second transporting pipeline are coupled to the bypass pipeline such that a flow of fluid between the first transporting pipeline and the second transporting pipeline is providable, wherein a bypass valve is installed between the bypass pipeline and at least one of the first transporting pipeline and the second transporting pipeline such that the flow of fluid between the first transporting pipeline and the second transporting pipeline is selectively adjustable.

11. The wind park arrangement according to claim 9, further comprising a compressor unit coupled to the main pipeline, wherein the compressor unit is coupled to the main pipeline for compressing the fluid in the main pipeline.

12. The wind park arrangement according to claim 9, further comprising a third system for transporting fluid generated by the wind turbine, a fourth system for transporting fluid generated by the wind turbine, and at least a further main pipeline to which a third transporting pipeline of the third system and a fourth transporting pipeline of the fourth system are coupled in parallel, wherein the main pipeline and the further main pipeline are coupleable by an interconnection pipe, wherein a main interconnection valve selectively adjusts a flow of fluid between the main pipeline and the further main pipeline.

13. A method for providing a system for transporting fluid generated by a wind turbine, the method comprising, providing at least one wind turbine for generating electrical power, wherein the wind turbine comprises a fluid producing unit configured for generating a fluid by using the generated electrical power, coupling a fluid pipeline system to the wind turbine for transporting the generated fluid, and coupling a pressure control system to the fluid pipeline system for controlling the fluid flow of the fluid in the pipeline system, wherein the pipeline system comprises a transporting pipeline and a connection pipeline, wherein the connection pipeline is coupled to the wind turbine and the transporting pipeline such that the fluid is transportable from the wind turbine to the transporting pipeline via the connection pipeline, wherein the pressure control system comprises a multi-way valve, wherein the multi-way valve is coupled to the transporting pipeline and the wind turbine, and wherein the multi-way valve is configured for selectively providing a flow of fluid from the wind turbine into the transporting pipeline, or that a flow of fluid through the transporting pipeline bypasses the wind turbine.

\* \* \* \* \*